United States Patent [19]
Shibata et al.

[11] Patent Number: 5,835,923
[45] Date of Patent: Nov. 10, 1998

[54] CONTENTS INFORMATION TRANSMITTING/VIEWING SYSTEM AND METHOD THEREFOR

[75] Inventors: Yoji Shibata, Yokosuka; Tetsuro Kiyomatsu, Seto; Shingi Domen; Shoji Higuchi, both of Fujisawa, all of Japan

[73] Assignee: Hitachi, Ltd., Tokyo, Japan

[21] Appl. No.: 615,881

[22] Filed: Mar. 14, 1996

[30] Foreign Application Priority Data

Mar. 16, 1995 [JP] Japan .................................. 7-056898

[51] Int. Cl.⁶ .................................................. G06F 17/21
[52] U.S. Cl. ........................ 707/526; 707/514; 707/520; 707/530; 707/539; 455/3.1; 358/453
[58] Field of Search .................. 395/139, 128, 395/761, 762, 763, 772, 774, 776, 777, 779–783, 788, 340; 358/403, 450, 453; 345/439, 428, 340; 707/500, 501, 502, 511, 513, 514, 515, 517–521, 526, 539, 530; 348/468, 7, 552; 455/3.1–6.3; 705/26–27

[56] References Cited

U.S. PATENT DOCUMENTS

| | | | |
|---|---|---|---|
| 5,146,552 | 9/1992 | Cassorla et al. | 395/776 X |
| 5,341,466 | 8/1994 | Perlin et al. | 395/139 |
| 5,440,401 | 8/1995 | Parulski et al. | 358/342 |
| 5,504,853 | 4/1996 | Schuur et al. | 395/340 X |
| 5,506,902 | 4/1996 | Kubota | 380/9 |
| 5,572,643 | 11/1996 | Judson | 395/793 |
| 5,586,235 | 12/1996 | Kauffman | 395/761 |
| 5,623,589 | 4/1997 | Needham et al. | 395/340 X |
| 5,630,103 | 5/1997 | Smith et al. | 395/500 |
| 5,634,064 | 5/1997 | Warnock et al. | 395/774 |
| 5,689,648 | 11/1997 | Diaz et al. | 705/26 |
| 5,708,960 | 1/1998 | Kamisaka et al. | 455/3.2 |

FOREIGN PATENT DOCUMENTS

| | | |
|---|---|---|
| 1-245637 | 9/1989 | Japan . |
| 5-89363 | 4/1993 | Japan . |

*Primary Examiner*—Joseph H. Feild
*Attorney, Agent, or Firm*—Antonelli, Terry, Stout & Kraus, LLP

[57] ABSTRACT

Publication articles each composed of a headline having relatively high information emphaticality and a text having relatively high information detailednessare coded on an article basis in an information provider apparatus. The coded information is transmitted to a user terminal. The transmitted information is first displayed on a display device of the user terminal in low magnification to display the headlines. The user selects a desired headline. The text corresponding to the selected headline is displayed in a magnification sufficient for making the displayed text legible. The novel setup realizes a publication contents information transmitting/viewing system by which a publication page can be viewed over and each can be read in generally the similar feeling and convenience as those of paper-based publications.

39 Claims, 30 Drawing Sheets

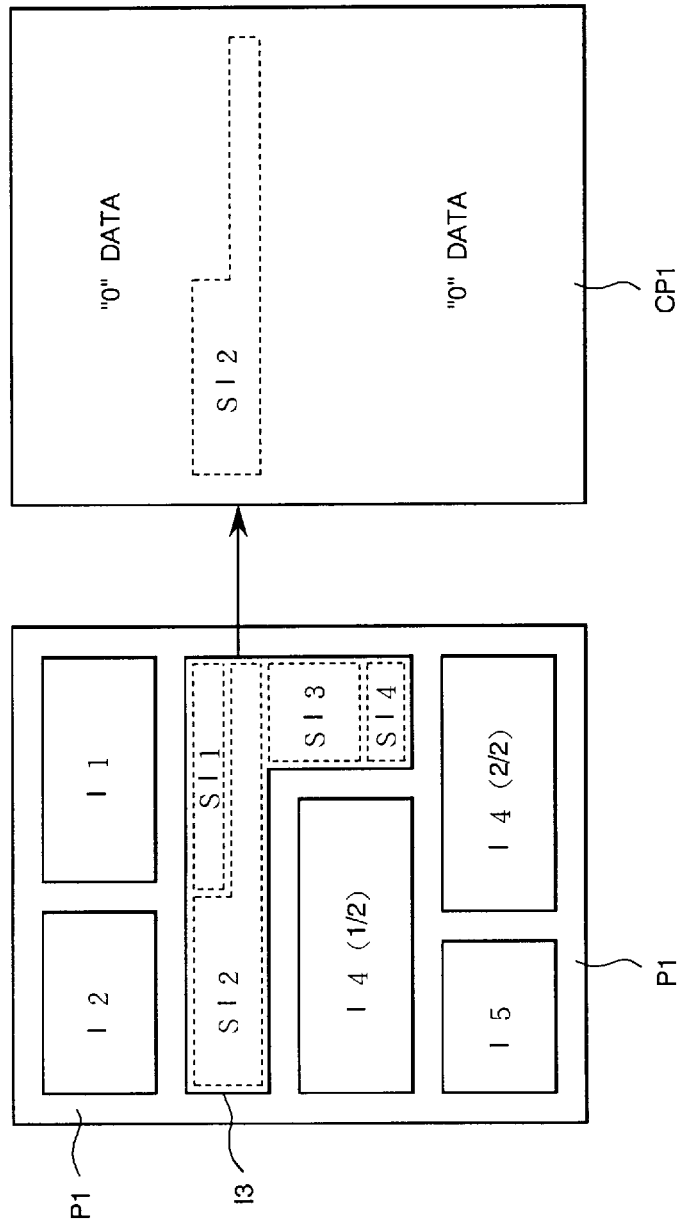

BASIC PAGE $$\begin{pmatrix} \text{DISPLAY POSITION} = (p, q) \\ \text{MAGNIFICATION} = \alpha \end{pmatrix}$$

FIG. 30

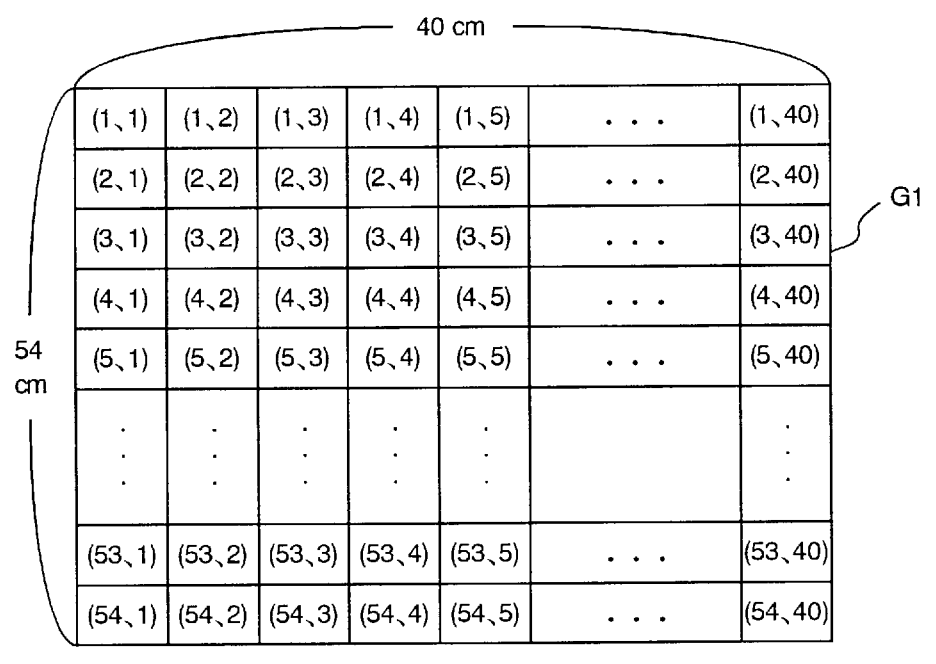

|  | 40 cm | | | | | | |
|---|---|---|---|---|---|---|---|
| (1,1) | (1,2) | (1,3) | (1,4) | (1,5) | . . . | (1,40) |
| (2,1) | (2,2) | (2,3) | (2,4) | (2,5) | . . . | (2,40) |
| (3,1) | (3,2) | (3,3) | (3,4) | (3,5) | . . . | (3,40) |
| (4,1) | (4,2) | (4,3) | (4,4) | (4,5) | . . . | (4,40) |
| (5,1) | (5,2) | (5,3) | (5,4) | (5,5) | . . . | (5,40) |
| : | : | : | : | : |  | : |
| (53,1) | (53,2) | (53,3) | (53,4) | (53,5) | . . . | (53,40) |
| (54,1) | (54,2) | (54,3) | (54,4) | (54,5) | . . . | (54,40) |

54 cm (height), G1

FIG. 31

| i2 |  | i1 | i1 | i1 | i1 | i1 |
|----|--|----|----|----|----|----|
| i2 |  | i1 | i1 | i1 | i1 | i1 |
| 0  |  | 0  | 0  | 0  | 0  | 0  |
| i3 |  | i3 | i3 | i3 | i3 | i3 |
| 0  |  | 0  | 0  | i3 | i3 | i3 |
|    |  |    |    |    |    |    |
|    |  |    |    |    |    |    |
| i5 |  | 0  | i4 | i4 | i4 | i4 |
| i5 |  | 0  | i4 | i4 | i4 | i4 |

71, 72, 73

CONTENTS INFORMATION TRANSMITTING/VIEWING SYSTEM AND METHOD THEREFOR

BACKGROUND OF THE INVENTION

1. Field of the Invention

The present invention relates to an information service system based on publications such as newspapers and magazines. More particularly, the present invention relates to a publication information transmitting/viewing system and a method therefor for providing publication information by electronic means. The publication herein means not only periodically or non-periodically issued paper-based newspapers, magazines, books and the like, but also information provided by electronic means such as magnetic disk, CD-ROM (Compact Disk Read-Only Memory), video tape, and video disk.

2. Description of the Related Art

Conventionally, newspapers, which are one of the representative publications including magazines and books, are produced in steps in which articles are written by reporters, edited at head office, typeset in a print shop, transmitted by facsimile to branch offices, and plotted, filmed, printed by rotary press at the branches, and finally delivered to readers.

The conventional newspaper service system based on paper medium allows readers to get a variety of large amount of and timely information at a relatively low costs. With respect to information usage, the conventional newspaper system provides many excellent merits including, for example, information viewability in which a reader can quickly pick up from large amounts of articles desired ones by means of headlines, photographs, figures, tables and the like; detail information acquirability in which the user can get detailed information by first reading an introductory of the desired article and then its text on the spot; and portability in which readers can carry newspapers to look at and read them anywhere and anytime because newspapers are light in weight, compact in size, and flexible in form. As such, newspapers as information medium has been and will continue to be one of the major tools of mass media. In addition, recent trends such as enhancing looks and legibility by, for example, coloring headlines, photographs and the like help this publication hold an unshakable position as means for providing wide-ranging and large amount of information including news and advertisements.

Despite the above-mentioned merits, however, the conventional newspaper system based on paper medium presents social and global problems such as the environmental exploitation caused by deforestation and the ever-increasing labor cost caused by home delivery. Especially, backcountries are faced with a problem of the delayed delivery which impairs the timeliness of news provision.

To solve the above-mentioned problems, a method was proposed as disclosed in Japanese Patent Laid-open No. Hei 1-245637 in which newspaper articles are electronically broadcast and delivered. The proposed method, however, is restricted to the simple electronic broadcasting and delivery providing no clear practical utility and implementing technologies, thus failing to be put in practical use so far.

Another method is disclosed in Japanese Patent Laid-open No. Hei 5-89363 for widely electronically delivering and selling information in newspapers, magazines and the like. In this method, the information is supplied via communications means such as a communications satellite to information vending machines in a broadcasting manner. To access the information thus supplied, a reader goes to a nearest vending machine and stores desired information from the machine into a special predetermined storage medium composed of a memory card, and displays the acquired information for reading. In this method, however, the contents and display form of the information thus acquired are largely different from those supplied newspapers as paper medium, thereby totally failing to provide the above-mentioned merits of newspapers as paper medium, namely information viewability and detail information acquirability. Therefore, this method cannot be expected to replace newspapers as paper medium.

Thus, no electronic newspaper system has been proposed that excels the conventional newspaper system as paper medium despite a variety of attempts in the electronic delivery and usage of newspaper information. That holds true with other publications including weekly and monthly magazines and periodicals.

Generally, information is stored in a medium (including the human brain). Generally, again, information in newspapers for example undergoes the following processing stages: (a) drafting and editing; (b) putting in medium (printing and replication); (c) delivery (sale and distribution); (d) usage; (e) accumulation and storage; and (f) reuse. Conventionally, each of the above-mentioned processing stages is implemented by paper medium as with the cases of newspapers, magazines, and books. Recently, all of these stages can be implemented in an electronic approach. The major merits of the electronic approach include the high processing speed and the ease of processing in each of the above-mentioned processing stages. This approach also contributes to the preservation of forest resources. Despite the merits, however, the electronic approach of publications is very slow in popularization in information provision and usage. Considering the wide readership of newspapers, books, and magazines and the huge amount of paper consumed for these media, it is desired to make the publications service systems go electronic as soon as possible.

Obstacles preventing truly easy-to-use electronic publications systems from being realized include the following by way of example:

(1) huge amounts of investments are required for both producers and consumers of such systems;

(2) the construction and maintenance of the infrastructures for such systems take a long time; and (3) many currently proposed electronic publications service systems require users to select between paper medium and electronic medium and therefore must convert from paper-based publication to electronic publication once and for all, which is impossible in reality because of the reasons (1) and (2) above.

Consequently, the basic purpose of the present invention is to implement an electronic publication system that smoothly converts paper-based publication to electronic publication. To achieve this objective, it is necessary to implement an electronic publications system that can offer merits at least equal to or better than the above-mentioned merits (viewability, acquirability, portability, and low cost) of conventional paper-based publications. In such an electronic publication system (or a publication information transmitting/viewing system), users must be able to access recent publications information anytime in the form similar to paper-based publications on an on-demand basis.

Another basic purpose of the present invention is to electronically implement a contents information transmitting/viewing system in which both paper-based publications and electronic publications can coexist. The new system allows the providers of publication contents to continue using the conventional infrastructures and the users to select both or either type of publications depending on usage environment and application.

Consequently, the transition and conversion from paper-based publications to electronic publications can be carried out quickly and in steps from the early stage as a whole. Fortunately, the above-mentioned creating and editing process (a) of publication industry has been already gone electronic. Therefore, it is desired for the popularization of the electronic publication contents transmitting/viewing system to retain the conventional approach for the subsequent processes of printing, delivery, usage, storage, and reuse, and, at the same time, provide means for electronically interacts with these processes for the electronic contents transmitting/viewing.

Further, it is an extended purpose of the present invention to electronically implement a publication information transmitting/viewing system that provides a new information provision and usage service hitherto impossible with the conventional paper-based publications.

It is another extended purpose of the present invention to electronically implement a publication information transmitting/viewing system of on-demand or interactive type in which a capability of bi-directional communication is provided that allows users to transmit their intentions such as requests to information providers unlike the one-way transmission of information form provider to user practiced in the conventional paper-based publication.

It is still another extended purpose of the present invention to electronically implement a publication information transmitting/viewing system for multi-media-based publications that can provide video information including moving pictures and audio information including voices and music in addition to the conventional visual information such as characters, photographs, figures and the like.

SUMMARY OF THE INVENTION

It is therefore a primary object of the present invention to provide a publication information transmitting/viewing system and a method for implementing the same in an electronic approach which make the most of the merits inherent to paper-based publication.

In other words, the present invention is intended to provide a publication information transmitting/viewing system in an electronic approach that allows users to access the publication information in generally the same feel and ease of use as they access conventional paper-based publications.

It is another object of the present invention to provide a publication information transmitting/viewing system in an electronic approach which makes the most of the infrastructure already gone electronic in the conventional paper-based publication service systems or to go electronic in the future.

It is still another object of the present invention to provide a publication information transmitting/viewing system in an electronic approach which coexists with the conventional or future paper-based publication services.

Consequently, it is yet another object of the present invention to provide electronic publication information which coexists with paper-based publications.

It is a separate object of the present invention to provide a publication information transmitting/viewing system in an electronic approach which also provides services hitherto impossible to be provided by the conventional paper-based publication services.

It is a still separate object of the present invention to provide in an electronic approach which information to be provided to users or stored by users can be restricted only to those pieces of information which are necessary for the users.

It is a yet separate object of the present invention to provide a publication information transmitting/viewing system in an electronic approach which provides a part of publications information in a form other than visual information based on still pictures.

In carrying out the invention and according to one aspect thereof, there is provided a publication information transmitting system having an information provider apparatus, at least one user terminal, and transmitting means for transmitting information from at least the information provider apparatus to the user terminal, the system being characterized by:

based on a publication article constituted by two-dimensionally arranging a plurality of sub-articles composed of information having relatively higher emphaticality and information having relatively higher detailedness, generating in the information provider apparatus first information including image information for each of the plurality of sub-articles and positional information on the publication article;

sending the first information from the information provider apparatus to the user terminal via the transmitting means;

receiving the first information by the user terminal;

based on the received information, outputting the information having the relatively higher emphaticality from the user terminal as legible information; and based on the legible information, outputting at least designated one of the plurality of sub-articles from the user terminal.

In carrying out the invention and according to another aspect thereof, there is provided a publication information transmitting system having an information provider apparatus, at least one user terminal, and transmitting means for transmitting information from at least the information provider apparatus to the user terminal, the system being characterized by:

based on a publication article constituted by two-dimensionally arranging a plurality of sub-articles composed of information having relatively higher emphaticality and information having relatively higher detailedness, generating in the information provider apparatus first information including image information for each of the plurality of sub-articles, an article number, and information about a boundary line between sub-article minor areas;

sending the first information from the information provider apparatus to the user terminal via the transmitting means;

receiving the first information by the user terminal;

based on the received first information and by designating one point on a desired article minor areas, designating an area number in the desired article minor area; and outputting the sub-article information about the designated article minor area from the user terminal.

The following describes the above-mentioned summary of the invention more specifically.

One basic feature of the present invention to solve the above-mentioned problems lies in that, because each of the articles constituting a publication is composed of a plurality of sub-articles such as headline, text, photograph, figure, and table which are different from each other in information emphaticality and information detailedness, each of the articles is digitally coded such that the image information of that article and the positional information of that article relative to the page of the publication are both included in the digital coding. This allows a user to first display on the terminal display device many articles for each page of the publication in the order in which they were edited and in a magnification sufficient ratio for recognizing the contents of a sub-article having relatively high information emphaticality. When the user designates one of the displayed articles to be read, the designated article is displayed along with its sub-articles having relatively high information emphaticality in a larger magnification ratio.

Another basic feature of the present invention lies in that, because each of the articles constituting a publication is composed of a plurality of sub-articles such as headline, text, photograph, figure, and table which are different from each other in information emphaticality and information detailedness, each of the articles is digitally coded on a sub-article basis such that the image information of the sub-article and the positional information of the sub-article relative to the page of the publication are both included in the digital coding. This allows a user to first display on the terminal display device sub-articles of having relatively high information emphaticality of many articles for each page of the publication in the order in which these articles were edited and in a magnification ratio sufficient for recognizing the contents of the sub-articles having relatively high information emphaticality. When the user designates one of the displayed articles to be read, the designated article is displayed along with its sub-articles having relatively high information emphaticality in a larger magnification.

Consequently, according to the features of the present invention, it is not always necessary for the user terminal to have all data of all pages of a publication at all times. At least necessary when displaying a page in a low magnification (display for overview) is only the data for the sub-articles having relatively high emphaticality of the plurality of articles for that page. When the user wants to acquire the detailedness of a particular article, there may only be the data for that article. This allows the publication information transmitting/viewing system according to the present invention can be implemented in a variety of setups as described below.

(1) Offline publication information transmitting/viewing system

All data of sub-articles having relatively high information emphaticality and sub-articles having relatively high information detailedness of all articles of all pages of a publication are delivered beforehand from the information publication provider to the user terminal via communication means. The user can retrieve desired data from the terminal as required. With this system, it is realistic to broadcast or deliver large amounts of data from the provider to many user terminals when the traffic of the communication means is low (nighttime for example). Its implementation requires each user terminal to have a mass file memory. Because all data are stored in this mass file memory, the user can access the data in the same manner as reading a paper-based publication; namely, without interacting with the provider. In addition, by using the data of sub-articles having relatively high information emphaticality of many articles, the user can search the articles for one that the user wants to read and retrieve only necessary ones from large amounts of the data of sub-articles having relatively high information emphaticality and the data of sub-article having relatively high information detailedness to store the retrieved data in a portable terminal for reading the data at any place desired.

(2) Semi-realtime publication information transmitting/viewing system

Data of sub-articles having relatively high information emphaticality of all articles of all pages of a publication are delivered beforehand from the information contents provider to the user terminal via the communication means. The sub-articles having relatively high information detailedness of a necessary article are provided on demand by the user. In this system, the necessary storage capacity of the user terminal may only be for the data of the sub-articles having relatively high information emphaticality of all articles of all pages of the publication. Thus, the storage capacity is significantly smaller than that of the system (1) above. The user terminal may be implemented as a portable terminal that can communicates with the provider apparatus.

(3) Realtime publication information transmitting/viewing system

All data of sub-articles having relatively high information emphaticality and relatively high information detailedness of all articles of all pages of a publication are provided on demand by the user. In this system, the necessary storage capacity of the user terminal may only be for storing the data of sub-articles having relatively high information emphaticality of one page of the publication and the data of sub-article having relatively high information detailedness of a particular page of which details are to be known. Thus, the user terminal can be implemented as a compact, light-weight portable terminal that can communicate with the provider apparatus, allowing the user to use an electronic publication in generally the same feeling as the user views a paper-based publication.

In each of the above-mentioned systems, the article information is coded into image information along with sub-articles having relatively high information emphaticality and relatively high information detailedness. The resultant image information is transmitted along with their positional information. This allows the user to view an electronic publication on the display device as if the user viewed a paper-based publication.

To ensure generally the same ease of overview as that of paper-based publication, it is necessary to transmit sub-articles having relatively high information emphaticality after coding the article information into image information. And the transmission needs to include their positional information. On the other hand, sub-articles having relatively high information detailedness may also be transmitted as voice information or picture information attached with voice, instead of the image information. This setup helps create an electronic publication based on an entirely new concept in which the ease of overview of conventional paper-based publications is provided and detailed information can be acquired by voice and image.

Listed below are the means for solving the above-mentioned problems according to the present invention.

According to the present invention, there is provided as a first aspect thereof a publication information transmitting/viewing system for converting, to electronic data on an information provider apparatus, a publication article page constituted by two-dimensionally arranging a plurality of publication articles composed of a plurality of sub-articles different from one another in information emphaticality and detailedness, transmitting the resultant electronic data to a user terminal, and reproducing the transmitted electronic data on a display device of the user terminal as a two-dimensional publication article page. In this system, the conversion of the publication article page to the electronic data is performed by the provider apparatus on an article basis. Article data corresponding to each publication article includes image information of that publication article and article positional information indicating a position of that publication article in the above-mentioned article page. The user terminal displays the publication article page on the display device in a relatively low magnification ratio such that the sub-articles having relatively high information emphaticality of the plurality of publication articles are legible. When the user designates, as a particular publication article, one of the plurality of publication articles displayed in low magnification, the sub-articles having a relatively high information detailedness of the designated particular publication article is made available for the user.

According to the present invention, there is provided as a second aspect thereof a publication information transmitting/viewing system for converting, to electronic data on an information provider apparatus, a publication article page constituted by two-dimensionally arranging a plurality of publication articles composed of a plurality of sub-articles different from one another in information emphaticality and detailedness, transmitting the resultant electronic data to a user terminal, and reproducing the transmitted electronic data on a display device of the user terminal as a two-dimensional publication article page. In this system, the conversion of the publication article page to the electronic data is performed by the provider apparatus on an article basis. Article data corresponding to each publication article includes image information of that publication article and article positional information indicating a position of that publication article in the above-mentioned article page. The user terminal displays the publication article page on the display device in a relatively low magnification ratio such that the sub-articles having relatively high information emphaticality of the plurality of publication articles are legible. When the user designates, as a particular publication article, one of the plurality of publication articles displayed in low magnification, the designated particular publication article is displayed in a relatively high magnification ratio such that the sub-articles having relatively high information detailedness of the particular publication article is legible.

According to the present invention, there is provided as a third aspect thereof, a publication information transmitting/viewing system for converting, to electronic data on an information provider apparatus, a publication article page constituted by two-dimensionally arranging a plurality of publication articles composed of a plurality of sub-articles different from one another in information emphaticality and detailedness, transmitting the resultant electronic data to a user terminal, and reproducing the transmitted electronic data on a display device of the user terminal as a two-dimensional publication article page. In this system, the conversion of the publication article page to the electronic data is performed by the provider apparatus on an article basis. Article data corresponding to each publication article includes image information of that publication article and article positional information indicating a position of that publication article in the above-mentioned article page. The user terminal displays the publication article page on the display device in a relatively low magnification ratio such that the sub-articles having relatively high information emphaticality of the plurality of publication articles are legible. When the user designates, as a particular publication article, one of the plurality of publication articles displayed in low magnification, the designated particular publication article is clipped for scrapping including the sub-articles having relatively high information detailedness of the particular publication article.

According to the present invention, there is provided as a fourth aspect thereof a publication information transmitting/viewing system for converting, to electronic data on an information provider apparatus, a publication article page constituted by two-dimensionally arranging a plurality of publication articles composed of a plurality of sub-articles different from one another in information emphaticality and detailedness, transmitting the resultant electronic data to a user terminal, and reproducing the transmitted electronic data on a display device of the user terminal as a two-dimensional publication article page. In this system, the conversion of the publication article page to the electronic data is performed by the provider apparatus on a sub-article basis according to the above-mentioned step. Sub-article data corresponding to each sub-article includes image information of that sub-article and sub-article positional information indicating an article position of that sub-article in the above-mentioned publication article page. The user terminal displays the publication article page on the display device in a relatively low magnification ratio such that the sub-articles having relatively high information emphaticality of the plurality of publication articles are legible. When the user designates, as a particular publication article, one of the plurality of publication articles displayed in low magnification, the sub-articles having a relatively high information detailedness of the designated particular publication article is made available for the user.

According to the present invention, there is provided as a fifth aspect thereof a publication information transmitting/viewing system for converting, to electronic data on an information provider apparatus, a publication article page constituted by two-dimensionally arranging a plurality of publication articles composed of a plurality of sub-articles different from one another in information emphaticality and detailedness, transmitting the resultant electronic data to a user terminal, and reproducing the transmitted electronic data on a display device of the user terminal as a two-dimensional publication article page. In this system, the conversion of the publication article page to the electronic data is performed by the provider apparatus on a sub-article basis according to the above-mentioned step. Sub-article data corresponding to each sub-article includes image information of that sub-article and sub-article positional information indicating an article position of that sub-article in the above-mentioned publication article page. The user terminal displays the publication article page on the display device in a relatively low magnification ratio such that the sub-articles having relatively high information emphaticality of the plurality of publication articles are legible. When the user designates, as a particular publication article, one of the plurality of publication articles displayed in low magnification, the designated particular publication article is displayed in a relatively high magnification ratio such that the sub-articles having relatively high information detailedness of the particular publication article is legible.

According to the present invention, there is provided as a six aspect thereof a publication information transmitting/viewing system for converting, to electronic data on an information provider apparatus, a publication article page constituted by two-dimensionally arranging a plurality of publication articles composed of a plurality of sub-articles different from one another in information emphaticality and detailedness, transmitting the resultant electronic data to a user terminal, and reproducing the transmitted electronic data on a display device of the user terminal as a two-dimensional publication article page. In this system, the conversion of the publication article page to the electronic data is performed by the provider apparatus on a sub-article basis according to the above-mentioned step. Sub-article data corresponding to each sub-article includes image information of that sub-article and sub-article positional information indicating an article position of that sub-article in the above-mentioned publication article page. The user terminal displays the publication article page on the display device in a relatively low magnification ratio such that the sub-articles having relatively high information emphaticality of the plurality of publication articles are legible. When the user designates, as a particular publication article, one of the plurality of publication articles displayed in low magnification, the designated particular publication article is clipped for scrapping including the sub-articles having relatively high information detailedness of the particular publication article.

According to the present invention, there is provided as a seventh aspect thereof the publication information transmitting/viewing system as defined in one of the first through sixth embodiments, wherein each of publication articles includes at least two types of sub-articles, namely a headline having relatively high information emphaticality and an article text having relatively high information detailedness.

According to the present invention, there is provided as a eighth aspect thereof the publication information transmitting/viewing system as defined in one of the above-mentioned embodiments, wherein the user terminal has a display scroll capability.

According to the present invention, there is provided as a ninth aspect thereof the publication information transmitting/viewing system as defined in one of the above-mentioned embodiments, wherein there are two or more publication article pages and the user terminal has a capability of switching the pages to be displayed on the display device.

According to the present invention, there is provided as a tenth aspect thereof the publication information transmitting/viewing system as defined in one of the above-mentioned embodiments, wherein the transmission of the electronic data from the provider apparatus is performed by broadcasting.

According to the present invention, there is provided as an eleventh aspect thereof the publication information transmitting/viewing system as defined in one of the above-mentioned embodiments, wherein the transmission of the electronic data from the provider apparatus is performed on demand from the user terminal with the provider apparatus being connected to the user terminal via the communication network.

According to the present invention, there is provided as a twelfth aspect thereof the publication information transmitting/viewing system as defined in one of the above-mentioned embodiments, wherein the transmission of the electronic data from the provider apparatus is performed by broadcasting from the provider apparatus for sub-articles having relatively high information emphaticality; for sub-articles having relatively high information detailedness, the transmission is performed on demand from the user terminal with the provider apparatus being connected to the user terminal via the communication network.

According to the present invention, there is provided as a thirteenth aspect thereof the publication information transmitting/viewing system as defined in one of the above-mentioned embodiments, wherein electronic data corresponding to sub-articles having relatively high information detailedness are audio/video information.

According to the present invention, there is provided as a fourteenth aspect thereof a publication information transmitting/viewing system, wherein an electronic paper information of a publication in which a lot of pieces of article information are electronically edited is retrieved, search information such as a title of publication, a date of issue, an edition number, and a page are added to the retrieved electronic paper information to be formatted, the resultant publication electronic information for user terminals is transmitted to the user terminals, the user views desired article information of the transmitted publication electronic information by using the above-mentioned search information.

According to the present invention, there is provided as a fifteenth aspect thereof the publication information transmitting/viewing system as defined in the fourteenth embodiment above, wherein large amounts of publication electronic information of many types for user terminals is transmitted to many user terminals based on a subscribing contract.

According to the present invention, there is provided as a sixteenth aspect thereof the publication information transmitting/viewing system as defined in one of the above-mentioned embodiments, wherein advertisement information is included in the article information, the advertisement information is designated at the user terminal as required, and order information corresponding to the designated advertisement is transmitted to the provider apparatus via the communication network.

The above-mentioned novel constitutions provide the following advantages over the prior art.

Because each of the articles constituting a publication is composed of a plurality of sub-articles such as headline, text, photograph, figure, and table which are different from each other in information emphaticality and information detailedness, each of the articles is digitally coded on a sub-article basis such that the image information of the sub-article and the positional information of the sub-article relative to the page of the publication are both included in the digital coding. This allows the information provider to easily perform the digital coding from the conventional publication editing and typesetting systems to transmit the resultant digital articles.

The user displays many articles for each publication page in the order of their editing on the display device in a low magnification ratio such that the contents of sub-articles having relatively high information emphaticality can be recognized. Consequently, the reader can easily find articles to be read as if the reader take a look at a paper-based publication.

When the user designates an article to be read by operating terminal input/output devices, the designated article can be displayed in higher magnification including its sub-articles having relatively high detailedness and clip any part of the displayed article. Thus, the user can easily acquire the detailed contents of articles as if the user take a look at a paper-based publication.

Because the minimum data required at a time is for sub-articles having relatively high emphaticality of multiple articles to be displayed in higher magnification or for one particular article including sub-articles having relatively high emphaticality or detailedness, services or systems of a variety of types can be provided.

If article information includes advertisements, an ordering operation at the user terminal permits electronic ordering of merchandise for example.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 5(A) and FIG. 5(B) are schematic diagrams illustrating image coding of newspaper articles;

FIG. 30 is a diagram explaining a matrix in which one page of newspaper is divided into minor areas;

FIG. 31 is a diagram explaining the creating of article boundary information based on the newspaper page of FIG. 29 and the matrix of FIG. 30;

DETAILED DESCRIPTION OF PREFERRED EMBODIMENTS

This invention will be described in further detail by way of example with reference to the accompanying drawings, the above-mentioned publication being a newspaper.

Figure 1:
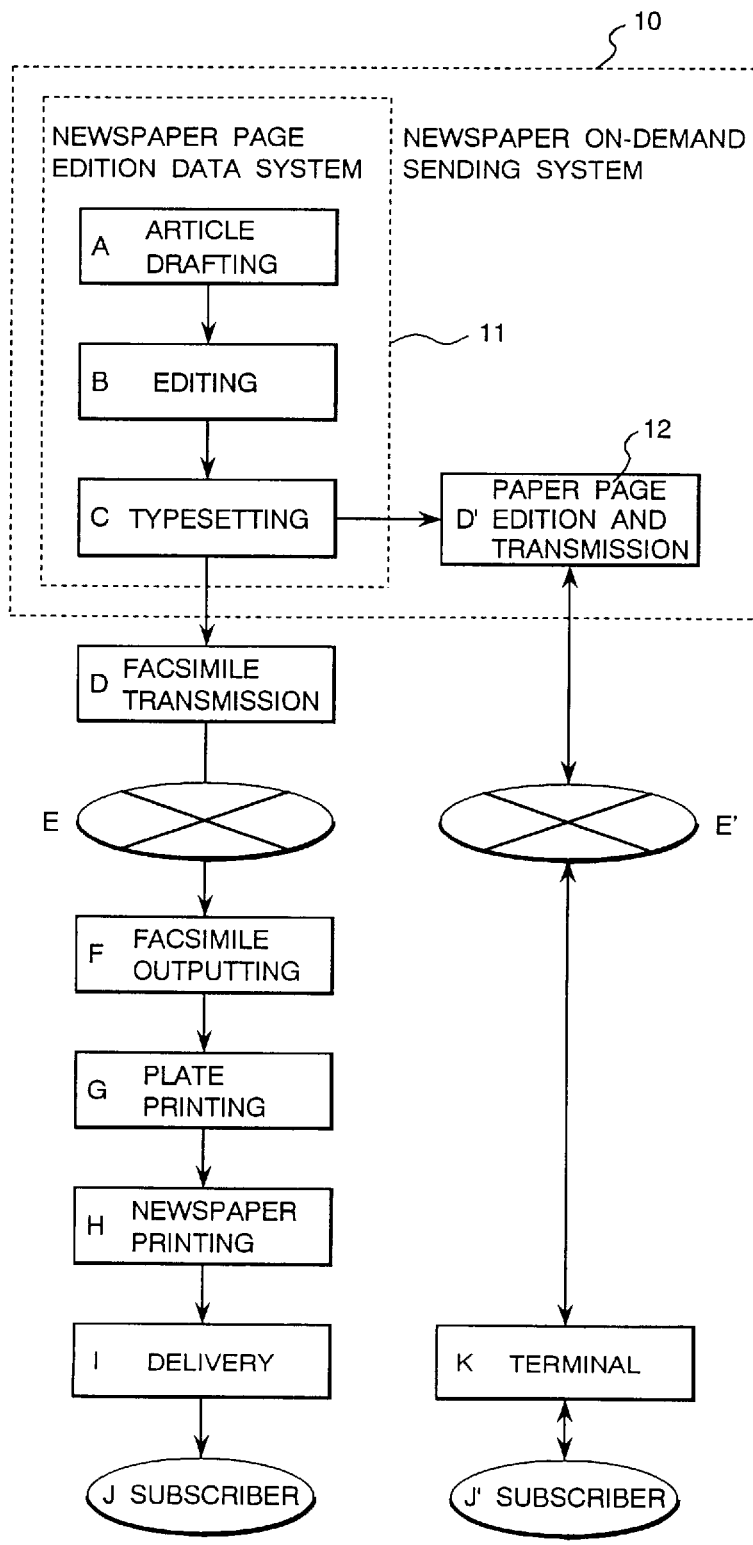
FIG. 1 is a block diagram illustrating a publication information transmitting/viewing system practiced as one preferred embodiment of the invention.

Now, referring to FIG. 1, there is shown a block diagram illustrating a basic construction of a newspaper contents information transmitting/viewing service system practiced as one preferred embodiment of the present invention. In the figure, a system shown on the left half of the diagram and composed of processes including article drafting A, editing B, typesetting C, facsimile transmission D, communication network E, facsimile outputting F, plate printing G, newspaper printing H, delivery I, and subscriber J is a known newspaper service system. For publishing a paper-based newspaper, generally, a draft written by a reporter is edited in the editing process B and is put in a final form of paper-based newspaper by the typesetting system C. The resultant newspaper is transmitted by the facsimile transmission system D to the branch offices via the communication network E. At each of the branch offices, transmitted newspaper is outputted from the facsimile output system F, put into the plate printing system G and then the newspaper printing process H to be put in the form of paper-based newspaper. The newspaper thus printed is delivered by the delivery system I to the subscriber J.

As shown above, the newspaper information in the typesetting system C is already electrical signals, so that the present invention converts these electrical signals into electronic newspaper information through a newspaper page editing and transmitting device D' of FIG. 1, transmits the resultant electronic newspaper information to a receiver terminal K via a communication network E' directly, displays the transmitted electronic newspaper information on a display device of the terminal K for a subscriber J' to receive the electronic newspaper service. It will be apparent that the subscriber J' can print out all or part of the received information as desired or required.

The present invention uses, without change, a newspaper page editing data system 11 that executes the processes of article drafting A, editing B, and (electronic) typesetting C in the conventional paper-based newspaper service system. This data system 11 is combined subsequently with the newspaper page editing and transmitting apparatus D' (12) to form a newspaper on-demand sending system 10. By the newspaper on-demand sending system 10, the newspaper page information is formatted into information suitable for the electronic transmission and view of newspaper. The formatted information is transmitted to the receiver terminal K via the communication network E'.

Figure 2:
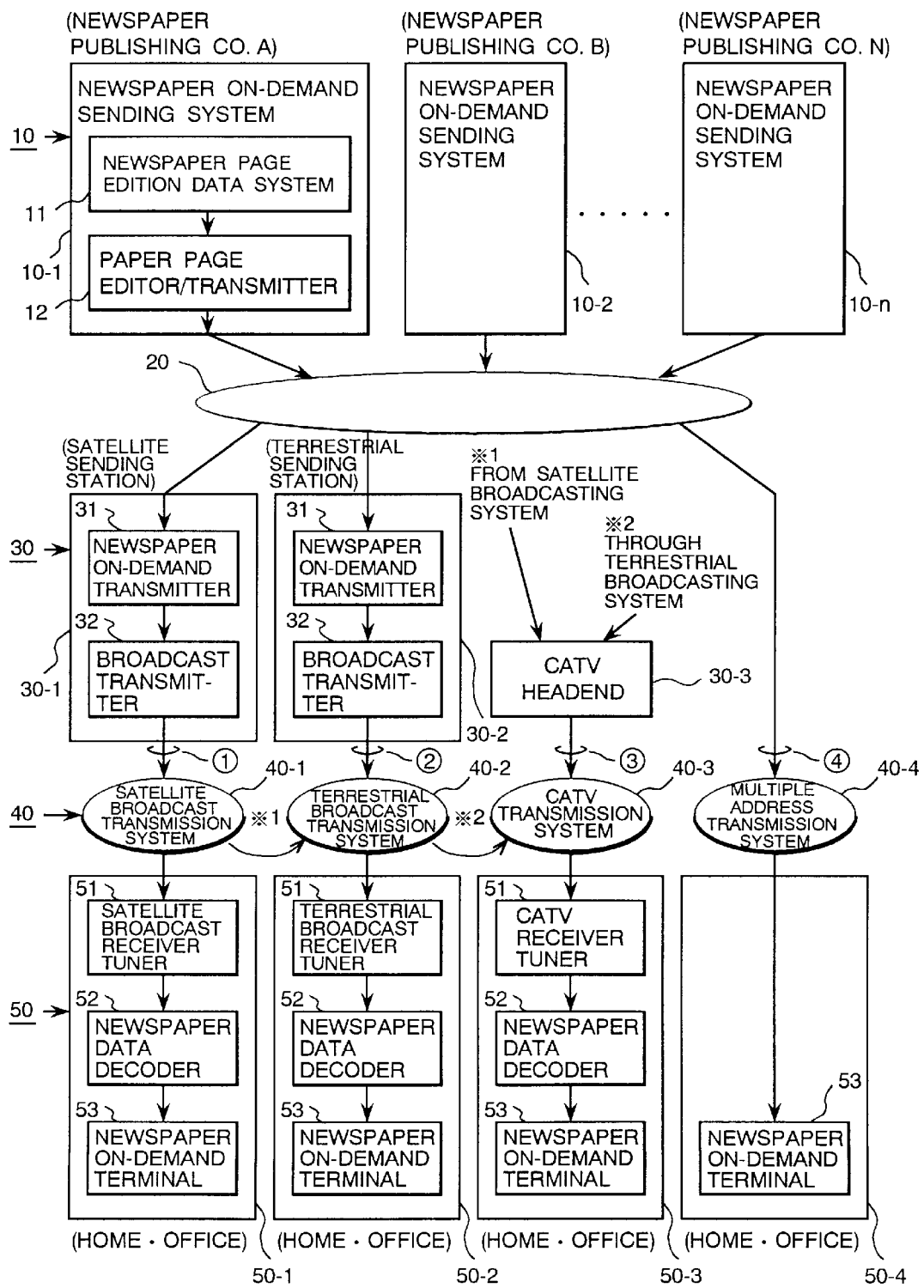
FIG. 2 is a detailed block diagram illustrating the embodiment of FIG. 1.

FIG. 2 shows a detailed block diagram illustrating the newspaper contents information transmitting/viewing system of FIG. 1. The newspaper contents information transmitting/viewing system according to the invention comprises the newspaper on-demand sending system 10, a communication network 20, a broadcast sending station 30, a broadcast transmission system 40, and a receiver terminal 50.

As described in FIG. 1, the newspaper on-demand sending system 10 comprises the newspaper page edition data system 11 and the electronic newspaper page editing and transmitting apparatus 12 (D' paper page edition and transmission) to convert, in-house, newspaper image data into a data format suitable for the newspaper on-demand sending system 10. The converted information is sent out to the communication network 20. The newspaper on-demand sending system 10 is provided at each of a plurality of newspaper companies (A through N).

The broadcast sending station 30 performs multiple address transmission of newspaper on-demand data to receiver terminal 50 installed in home or office via the broadcast transmission system 40. The multiple address transmission is performed through path 1 in which newspaper on-demand data is transmitted from a satellite sending station 30-1 via a satellite broadcast transmission system 40-1, path 2 in which the newspaper on-demand data is transmitted from a terrestrial sending station 30-2 via a terrestrial broadcast transmission system 40-2, or path 3 in which a signal to be transmitted the satellite sending station 30-1 or the terrestrial sending station 30-2 is received by a CATV head end 30-3 to be transmitted to home or office via a CATV transmission system 40-3.

The receiver terminal 50 comprises a receiver tuner 51, a newspaper data decoder 52, and a newspaper on-demand terminal 53.

Further, a simplified version of the newspaper contents information transmitting/viewing system according to the invention has a path 4 in which newspaper on-demand data is delivered from the newspaper on-demand sending system 10 in each newspaper company to the newspaper on-demand terminal in home or office via the communication network 20 by using a multiple address transmission system 40-4 such as the Internet.

Figure 3:
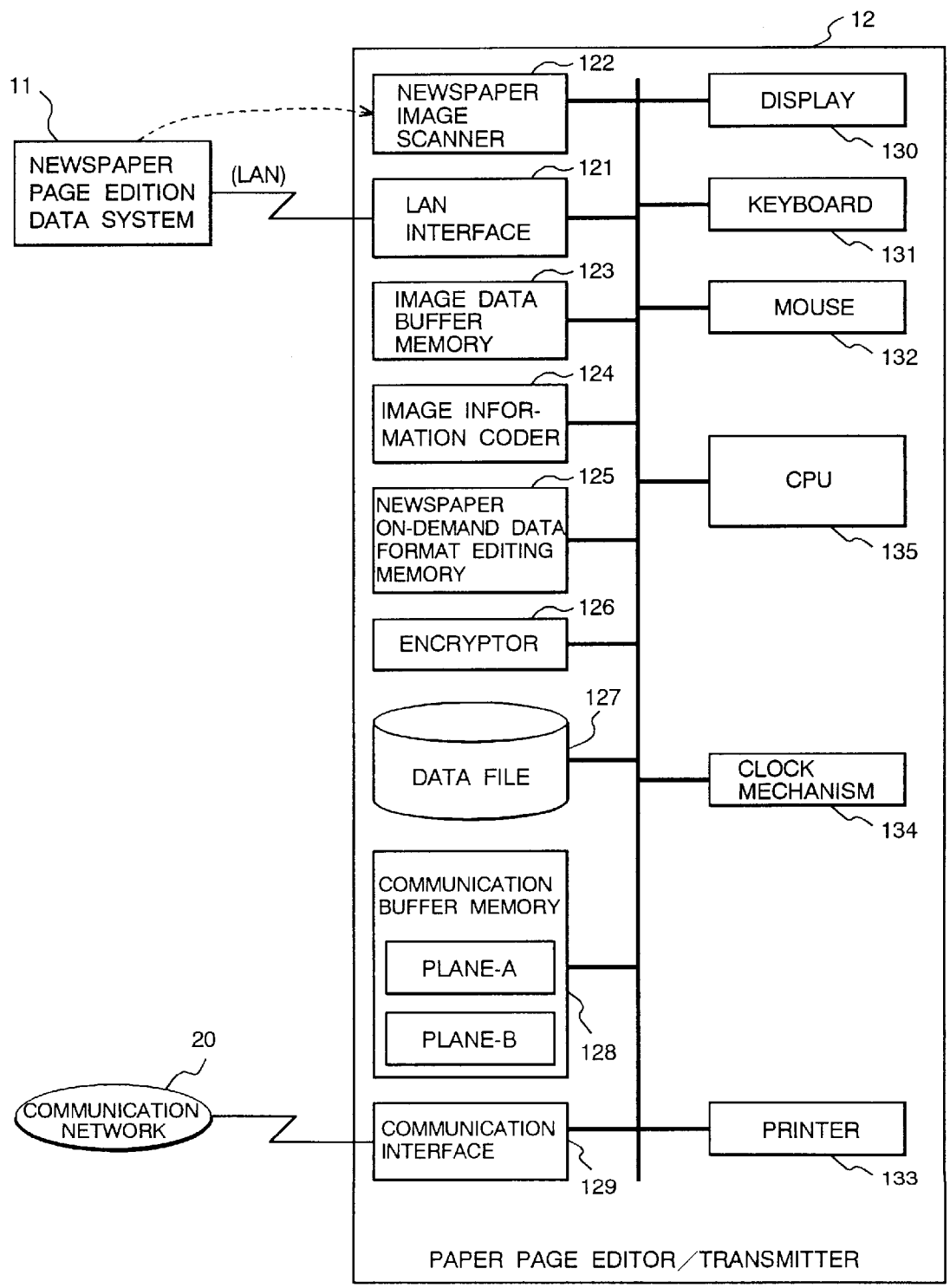
FIG. 3 is a block diagram illustrating the constitution of a newspaper on-demand transmitting system.

Referring to FIG. 3, the newspaper on-demand sending system 10 will be described in detail.

The newspaper on-demand sending system 10 comprises the newspaper page edition data system 11 and the electronic newspaper page editing and transmitting apparatus 12. The newspaper page edition data system 11 is a newspaper editing electronic system employed by nationwide newspapers for example. The print information of the final process of the system 11 is sent as image information to the apparatus 12 via the LAN (Local Area Network) such as the Ethernet or the token passing ring. If it is difficult to directly connect the system 11 with the apparatus 12, paper-based newspaper pages are scanned by an image scanner to be sent to the apparatus 12 as image information.

The electronic newspaper page editing and transmitting apparatus 12 comprises a LAN interface 121, a newspaper image scanner 122, an image data buffer memory 123 for holding the data read by the LAN interface 121 or the scanner 122, an image information coder 124 for coding the image data, a newspaper on-demand data format editing memory 125 for editing into a predetermined format the text information necessary for delivering newspaper on-demand data and the coded newspaper image information, an encryptor 126 for all newspaper on-demand data except for the control information, a data file 127 for storing all newspaper on-demand data including the encrypted data, and a communication buffer memory 128 and a communication interface 129, both for sending the newspaper on-demand data from the data file 127 to a predetermined destination via the communication network 20 when a predetermined time comes.

The electronic newspaper page editing and transmitting apparatus 12 further comprises input/output devices such as a display device 130, a keyboard 131, a mouse 132, and a printer 133, and a clock mechanism 134 for controlling the timing of the apparatus 12, and a CPU (Central Processing Unit) 135 for totally controlling the apparatus 12.

Before describing the electronic newspaper page editing and transmitting apparatus 12 of FIG. 3, the layout and coding of newspaper pages will be described with reference to FIGS. 4 through 5.

Figure 4A:
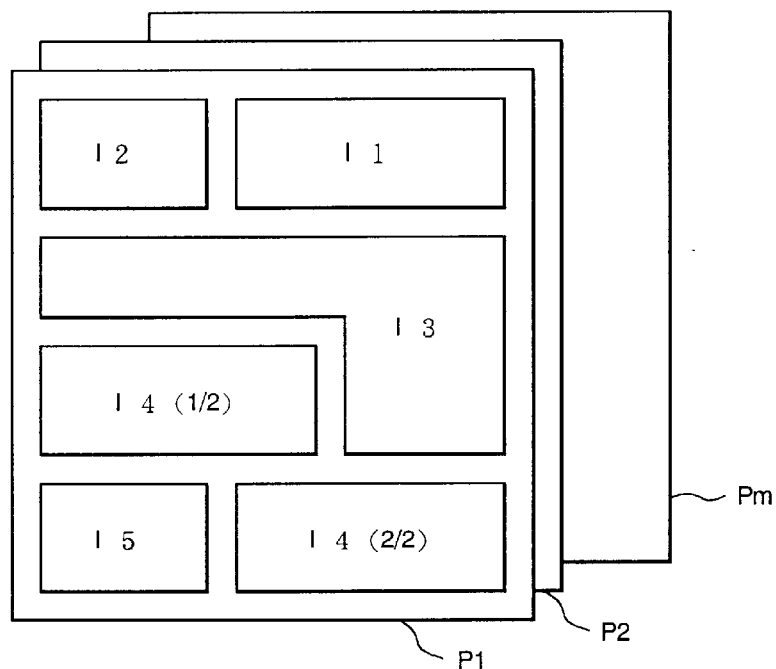
FIG. 4(A) and FIG. 4(B) are schematic diagrams illustrating an example of a setup of a newspaper.
Figure 4B:
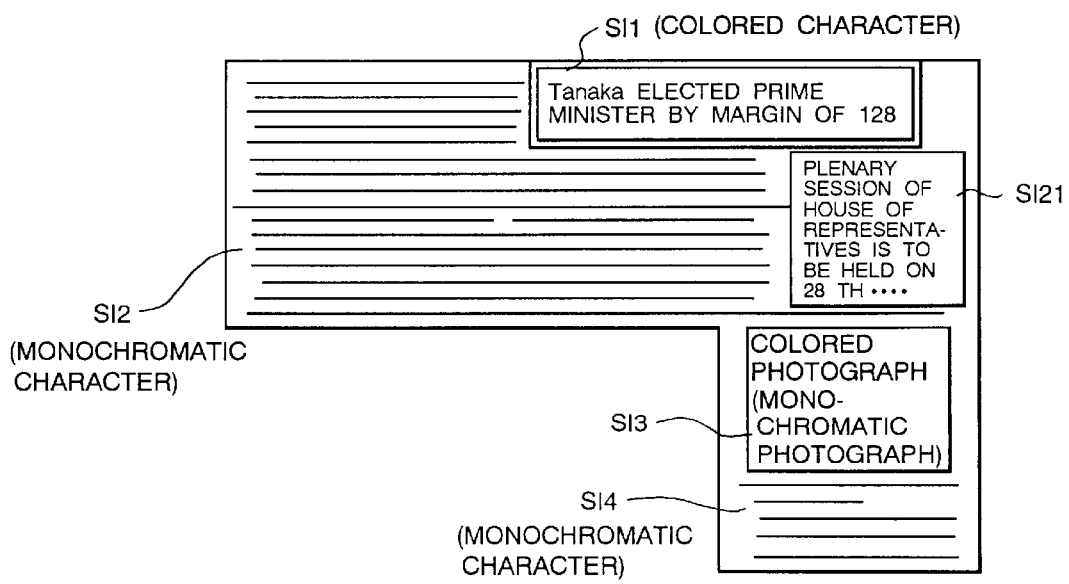

Referring to FIG. 4, generally, a newspaper is made up of a plurality of pages P1 through Pm, each page carrying a plurality of articles I1 through In. In an example of FIG. 4(A), page P1 carries five articles I1 through I5. Each of the articles is made up of a plurality of sub-articles SI1 through SIk such as a headline, a photograph, and a text. In an example of FIG. 4(B), the article I3 of page P1 is made up of four sub-articles; that is, a headline SI1, a text SI2, a photograph SI3, and a photograph explanatory text SI4.

The sub-articles are classified according to visual appeal, namely the degree of information emphaticality. In the example of FIG. 4(B), the headline SI1 and the photograph SI3 have ease of overview and acquirability that generally permit to convey the information of these sub-articles to the reader at a glance even when they are displayed with the other sub-articles. Therefore, these two sub-articles are assumed to have higher emphatically than the others. These sub-articles are called information emphatic sub-articles hereinafter.

As for the text SI2 and the photography explanatory text SI4, it is not required to grasp their contents when a large number of articles are viewed over. These sub-articles are read in detail when the contents of the article I3 is to be known in detail. Therefore, the information emphaticality of these sub-articles may be lower. But these sub-articles require to convey detailed information, or have information detailedness. These sub-articles are called information detailed sub-articles hereinafter.

Moreover, a small headline at the beginning of the text SI2 can be separated as another sub-article SI21. In this case, the information emphaticality and detailedness of the sub-article SI21 are between those of the information emphatic sub-article and the information detailed sub-article.

Referring to FIG. 5, a method of coding a newspaper article according to the invention will be described.

According to one preferred embodiment of the invention, a newspaper article is coded on a sub-article basis. FIG. 5 shows an example of coding the sub-article SI2 of the article I3 of the page of FIG. 5 (A). As shown in FIG. 5 (B), when coding the sub-article SI2 of the article I3, a coding page CP1 that carries only the sub-article SI2 of the article I3 is assumed for the page P1, with the portions other than the sub-article SI2 being handled as blank, or data "0". This is advantageous in not requiring separation address information for each sub-article thus picked up. Also, in practice, overlapping the coding data of all sub-articles of the articles I1 through I5 can compose the entire articles of the page P1.

Figure 6:
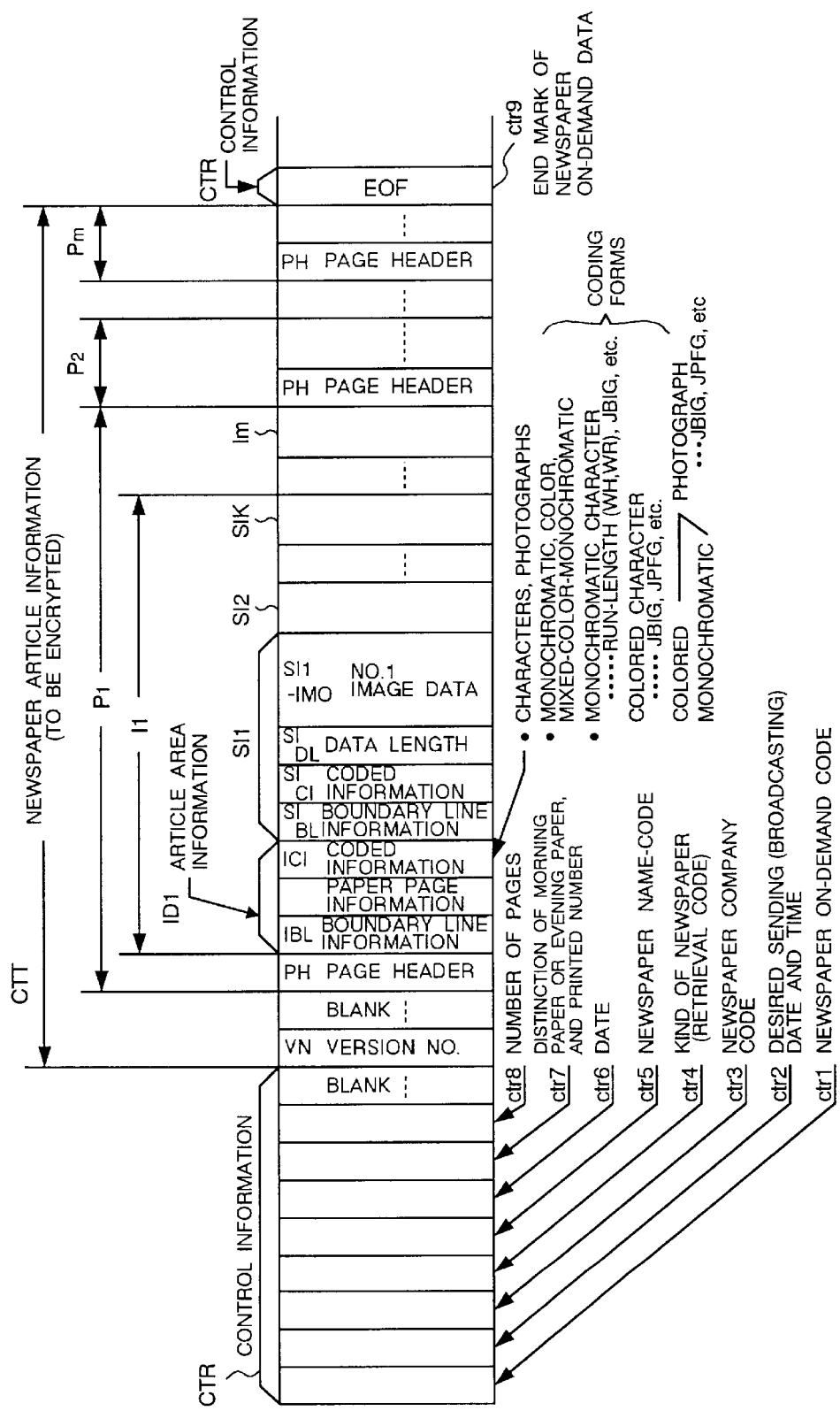
FIG. 6 shows a format of newspaper on-demand data.

FIG. 6 shows a data format of the newspaper on-demand data thus coded. The newspaper on-demand data format is constituted by control information CTR and newspaper article information CTT.

The control information CTR is used to transmit, file, and search newspaper on-demand data. the CTR is composed of information ctr1 through ctr8 preceding the on-demand data and information ctr9 succeeding the on-demand data.

The ctr1 is a newspaper on-demand code indicating the start of the newspaper on-demand data; the ctr2 is a desired sending date and time code for designating a date and time for sending (broadcasting) the on-demand data to the user terminal; ctr3 is a newspaper company code assigned to each newspaper company; ctr4 is a newspaper type code for indicating types of newspapers such as general paper, economics paper, and industry paper; ctr5 is a newspaper name code; ctr6 a date of issue code; ctr7 is a code for indicating morning paper and evening paper and edition; ctr8 is a number of page code; and ctr9 is and EOF (End Of File) code indicating the end of the newspaper on-demand data.

The newspaper article information CTT is the information of the articles of the paper, which is subject to encryption. Encryption is performed to allow only the contracted subscribers to read the newspaper. However, since the contents of the newspaper themselves are not confidential, high-level encryption is not required. That is, encryption of a level may only be performed to make a prospective illegal subscriber recognize that decryption does not pay. Further, it is desirable to perform encryption that invalidates decryption in a short run. To be more specific, decypher keys are changed on a subscription basis, for example, on a newspaper name basis or monthly basis, a new decryption key being assigned every time to each newspaper terminal via the network; alternatively, the newspaper terminal is adapted to automatically access the network to receive the new key. The automation of the decryption key transfer reduces operation load in general and minimizes chance of interception of the key by the illegal subscriber.

The newspaper article information CTT is largely made up of a version number VN and article contents information. The version number VN is a control number of be controlled according the change in the article information format and coding form. The article information format is expected to be updated frequently. On the sending side, attaching the version number VN corresponding to the format allows the receiving side to reference a publication of any version according to that format by one receiver system. This makes it possible to manage receiver terminals that are generally considered unmanageable, by always sending an up-to-date system through broadcasting.

The article contents information is composed of coded information data for m pages from the page P1 to page Pm. FIG. 6 shows for example only the coding information data of the page P1, the article I1, the sub-article SI1 representatively, the others being simplified or omitted from the figure. First, a page header PH is placed at the beginning of the page information for each page. Each of the articles I1 through Ik is preceded with article region information IDI including article boundary line information IBL, article page information, and article coding information ICI. The article coding information ICI is information necessary for coding the article concerned. The ICI information includes color code information for indicating the color of the entire article concerned is monochrome, color, or both; an expression medium code for indicating expression medium is character, photograph, or both; and a coding form code for indicating a coding form suitably selected for each expression medium. For example, for the coding form code, run-length (MH or MR), JBIG (Joint Bi-level Image Experts Group) or the like can be used for monochrome characters; JBIG, JPEG (Joint Photographic Coding Experts Group) or the like can be used for color characters; and JBIG, JPEG or the like, whichever is suitable, can be used for photographs of both color and monochrome.

Next, the coding information of sub-articles will be described. As shown in the sub-article information SI1, this coding information includes sub-article boundary line information SIBL, sub-article coding information SICI, sub-article data length SIDL, and sub-article image data SI1-IMD. The sub-article boundary line information SIBL indicates address information in the page of the sub-article concerned; the sub-article coding information SICI indicates the coding form used in the sub-article; the sub-article data length SIDL indicates the data length of the entire sub-article; and the sub-article image data SI1-IMD indicates the image data obtained by image-coding the entire sub-article.

Figure 7:
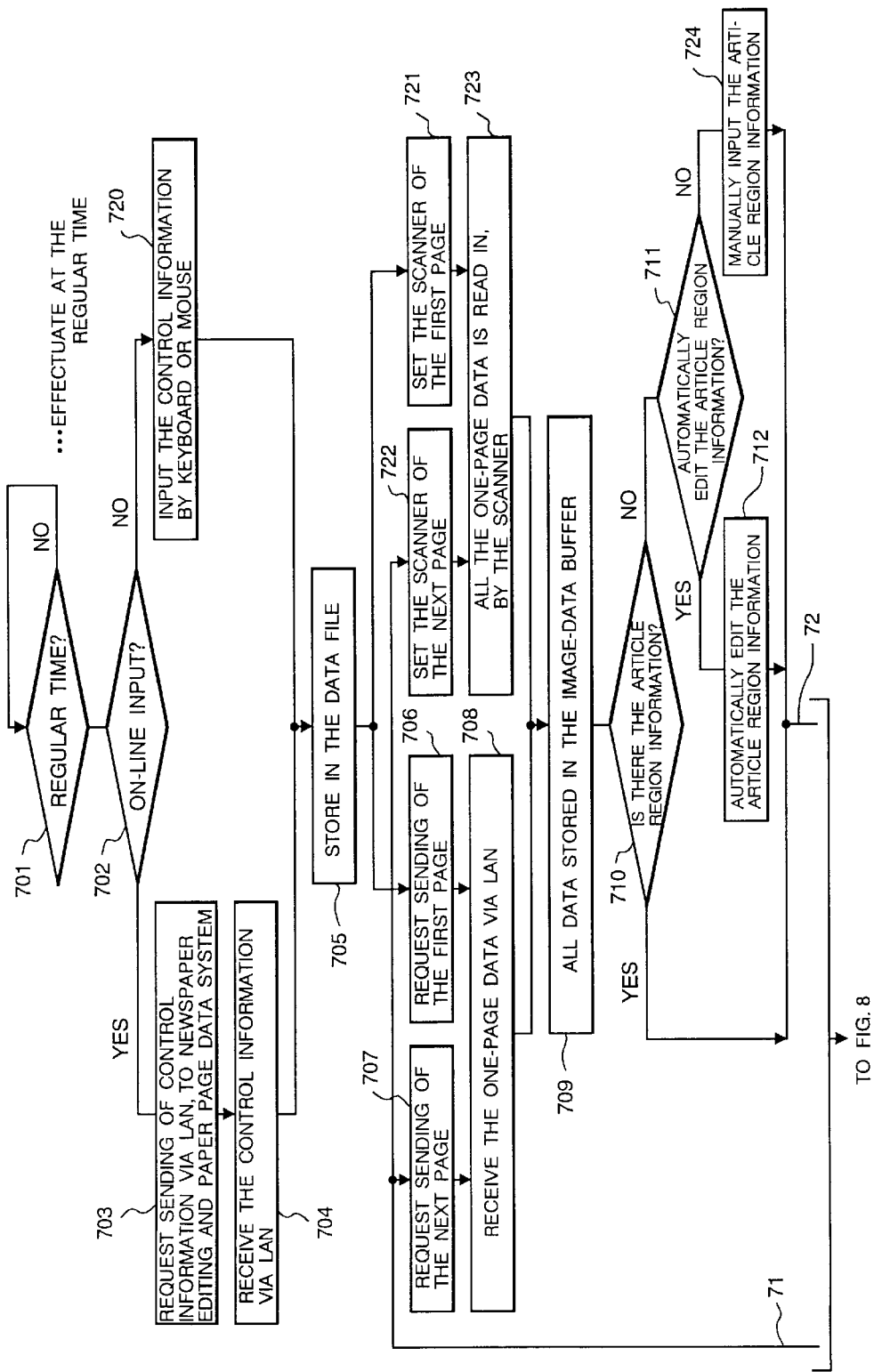
FIG. 7 is a flowchart indicating the first half of the editing processing for newspaper page coding.
Figure 8:
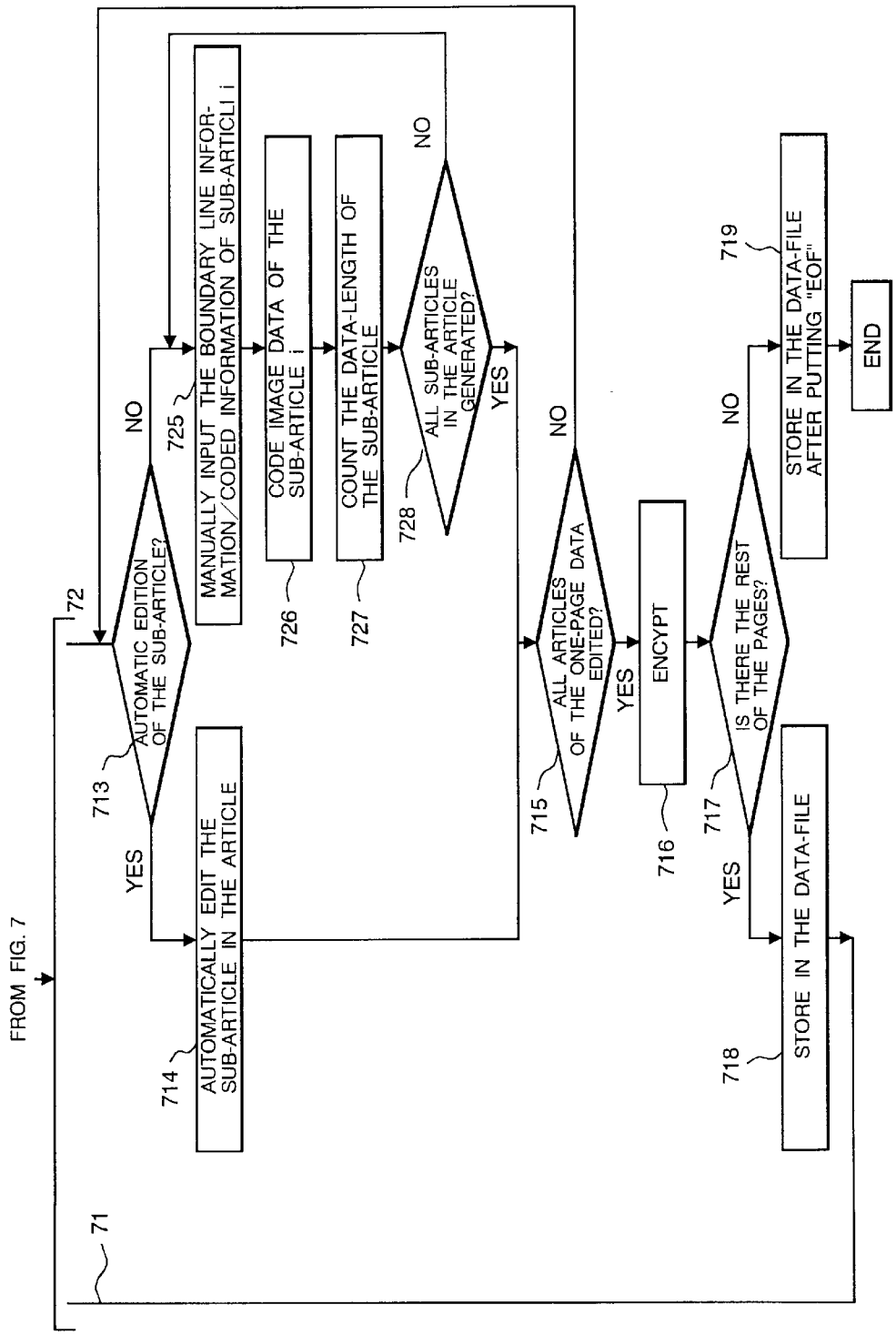
FIG. 8 is a flowchart indicating the last half of the editing processing for newspaper page coding.

FIGS. 7 through 10 are flowcharts indicating the processing by the newspaper page editing and transmitting apparatus of FIG. 3. FIGS. 7 and 8 indicate the flow of page editing processing and FIGS. 9 and 10 indicate the flow of sending processing.

The processing of page editing of FIGS. 7 and 8 is performed in the following manner. As described before, this processing includes the online processing that is performed via the LAN interface 121 of FIG. 3 and the offline processing that is performed by using the newspaper image scanner 122.

First, the online input will be described. Referring to FIG. 7, when the time to process page editing comes (step 701), the control information CTR is entered online (step 702). That is, a request for sending the control information CTR is issued to the newspaper page edition data system 11 via the LAN (step 703) to receive the requested control information CTR via the LAN (step 704), the received control information CTR being stored in the data file (step 705). Then, the processing of editing of the newspaper article information data CTT starts.

When a request for sending article information for one page of the page 1 or the next page has been issued to the newspaper page edition data system 11 (steps 706 and 707), and the requested article information for one page is received (step 708), it is stored in the image data buffer memory 123. Then, it is checked whether there is article region information (step 710). If the article region information is found, check is made whether to perform automatic editing of sub-article (step 713) of FIG. 8. If the article region information is not found, check is made whether to perform automatic editing of the article region information (step 711). If the automatic editing is to be performed, the article region information is automatically coded (step 712) to check whether to perform automatic editing of sub-article (step 713) of FIG. 8. In the online input, the automatic editing of sub-article is to be performed, so that it is performed (step 714). When the automatic editing of all sub-articles for one page has been completed (step 715), encryption is performed (step 716). The encrypted information is stored in the data file without being attached with the EOF (step 718) if a page remains to be edited. If all required pages have been edited (step 717), the encrypted information is attached with the EOF to be stored in the data file (step 719).

In the offline input, the control information CTR is entered by the keyboard or mouse (step 720) of FIG. 7 to be stored in the data file (step 705). Then, the processing of editing the newspaper article information CTT starts.

First, the scanner 122 is set up (steps 721 and 722). Newspaper information for one page of page 1 or the next page is read as image data (step 723) to be stored in the image data buffer memory 123 (step 709). Then, the article region information is manually entered (step 724), followed by the manual editing of sub-article information. Namely, as shown in FIG. 8, the boundary line information and coding information are entered (step 725) for each of sub-articles of an article to be coded into image data (step 726) of which length is counted (step 727). When the sub-articles for one article have been edited (step 728), the manual editing of sub-articles of other article in the page is performed. When the editing of that page has been completed (step 715), the edited data are encrypted (step 716) to be stored in the data file (steps 717 and 718). The above-mentioned processing operations are repeated until all articles of all pages have been edited.

The following describes the flow of the processing for sending the newspaper on-demand data edited as mentioned above with reference to FIGS. 9 and 10.

Figure 9:
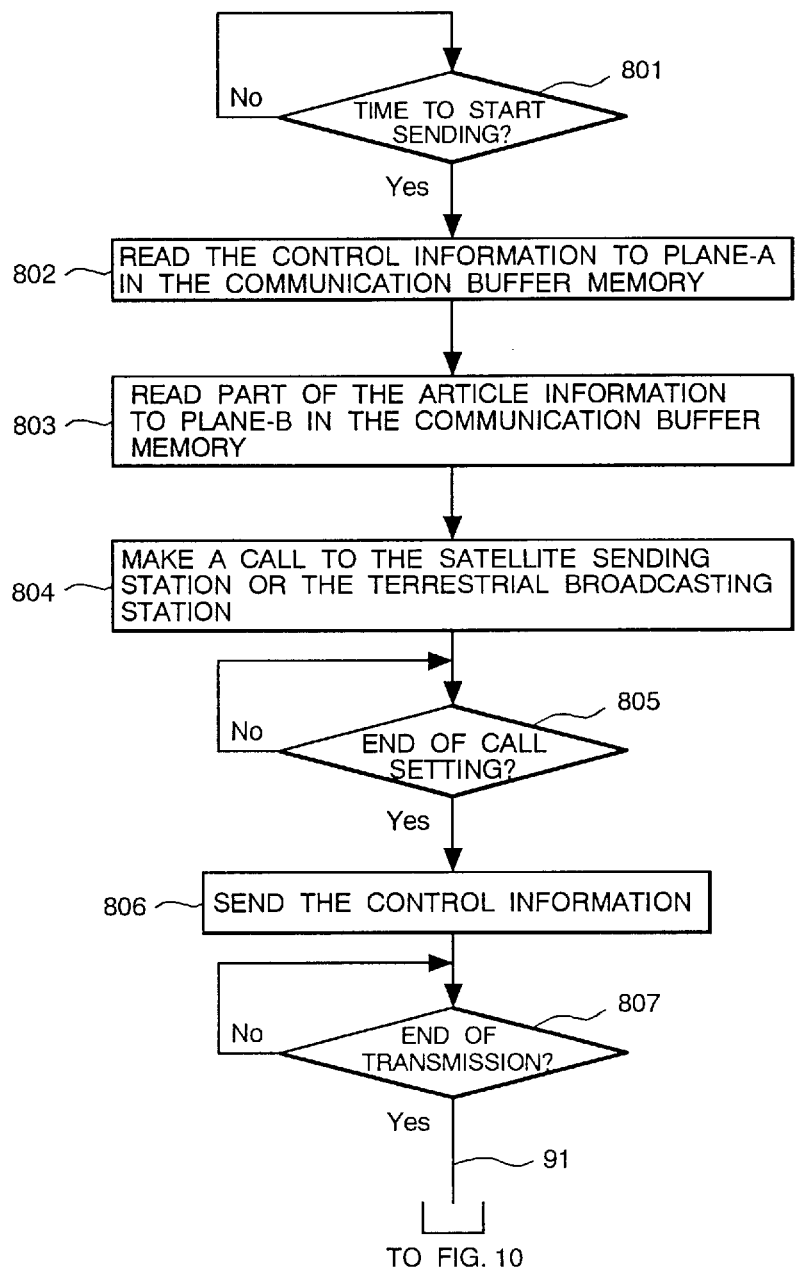
FIG. 9 is a flowchart indicating the first half of the newspaper on-demand data transmitting processing.
Figure 10:
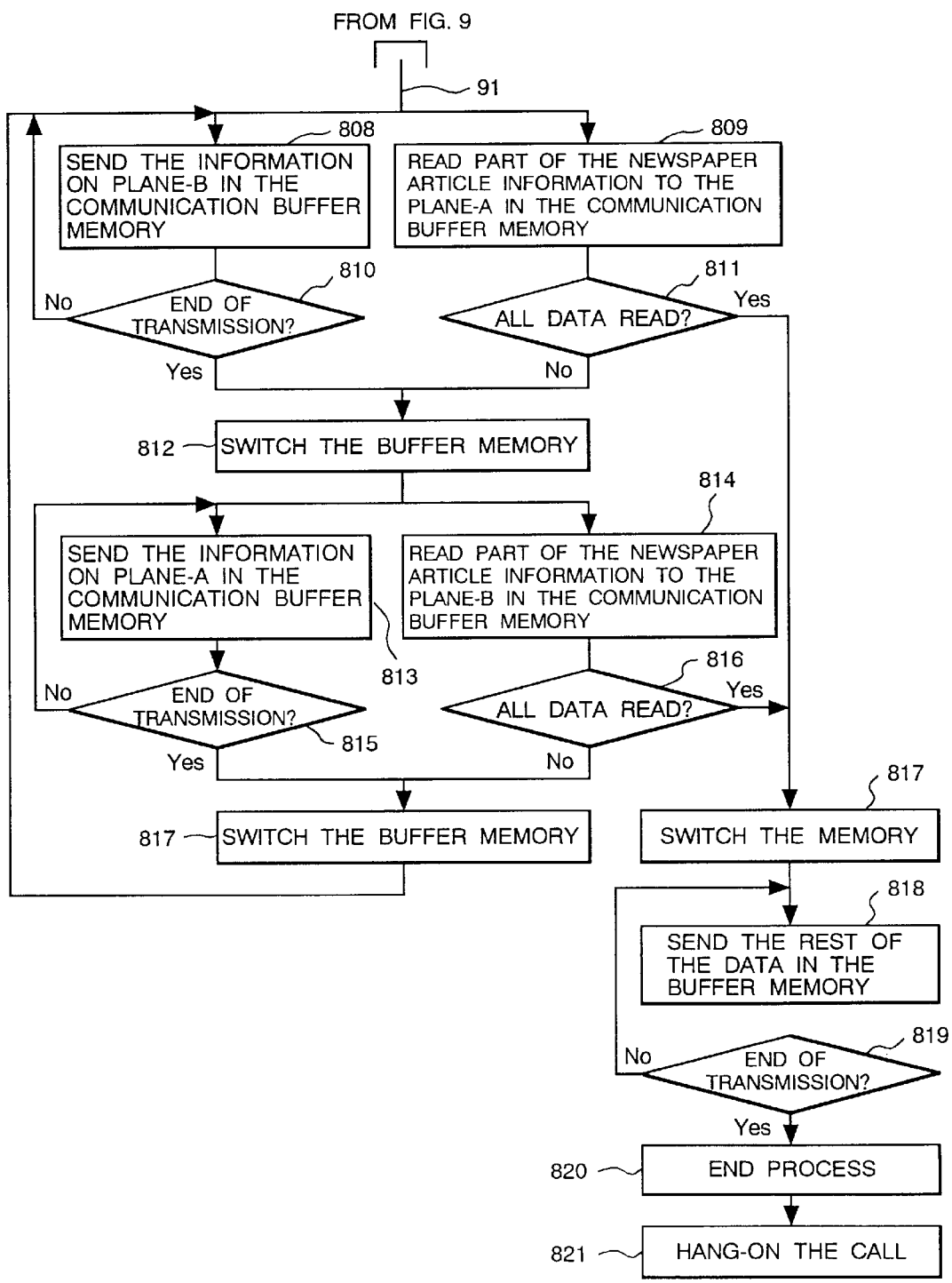
FIG. 10 is a flowchart indicating the last half of the newspaper on-demand data transmitting processing.

Referring to FIG. 9, when a transmission start times comes (step 801), the control information CTR is read to plane-A of the communication buffer memory 128 (step 802) and part of the newspaper article information CTT is read to plane-B of the memory 128 (step 803). Then, the newspaper on-demand terminal is called (step 804). When the call setting has been completed (step 805), the control information CTR is sent (step 806). When the control information CTR has been sent (step 807), the newspaper article information data CTT is read from the plane-B of the communication buffer memory 128 (step 808) as shown in FIG. 10 and next newspaper article information data CTT is read to the plane-A of the communication buffer memory 128 (step 809). If the transmission of the control information CTR has been completed (step 810) or if the reading of the newspaper article information data CTT has not been completed (step 811), the planes of the communication buffer memory are switched (step 812), the newspaper article information data CTT is read from the plane-A of the communication buffer memory 128 (step 813), and next newspaper article information data CTT is read to the plane-B of the communication buffer memory 128 (step 814). If the transmission of the plane-A information has been completed (step 815) or if the reading from the plane-B has not been completed (step 816), the planes of the buffer memory is further switched (step 817) to repeat the above-mentioned processing operations. When the data have been all read from either the plane-A or the plane-B of the buffer memory (steps 811 and 816), the empty plane is switched to the other plane (step 817). When both planes have been all read (steps 818 and 819), the ending processing is performed (step 820) to disconnect the call (step 821).

Next, the satellite sending station or terrestrial sending station 30 of FIG. 2 will be described. The satellite sending station 30-1 or the terrestrial sending station 30-2 comprises a newspaper on-demand transmitter 31 and a broadcast transmitter 32. First, the newspaper on-demand transmitter 31 will be described.

Figure 11:
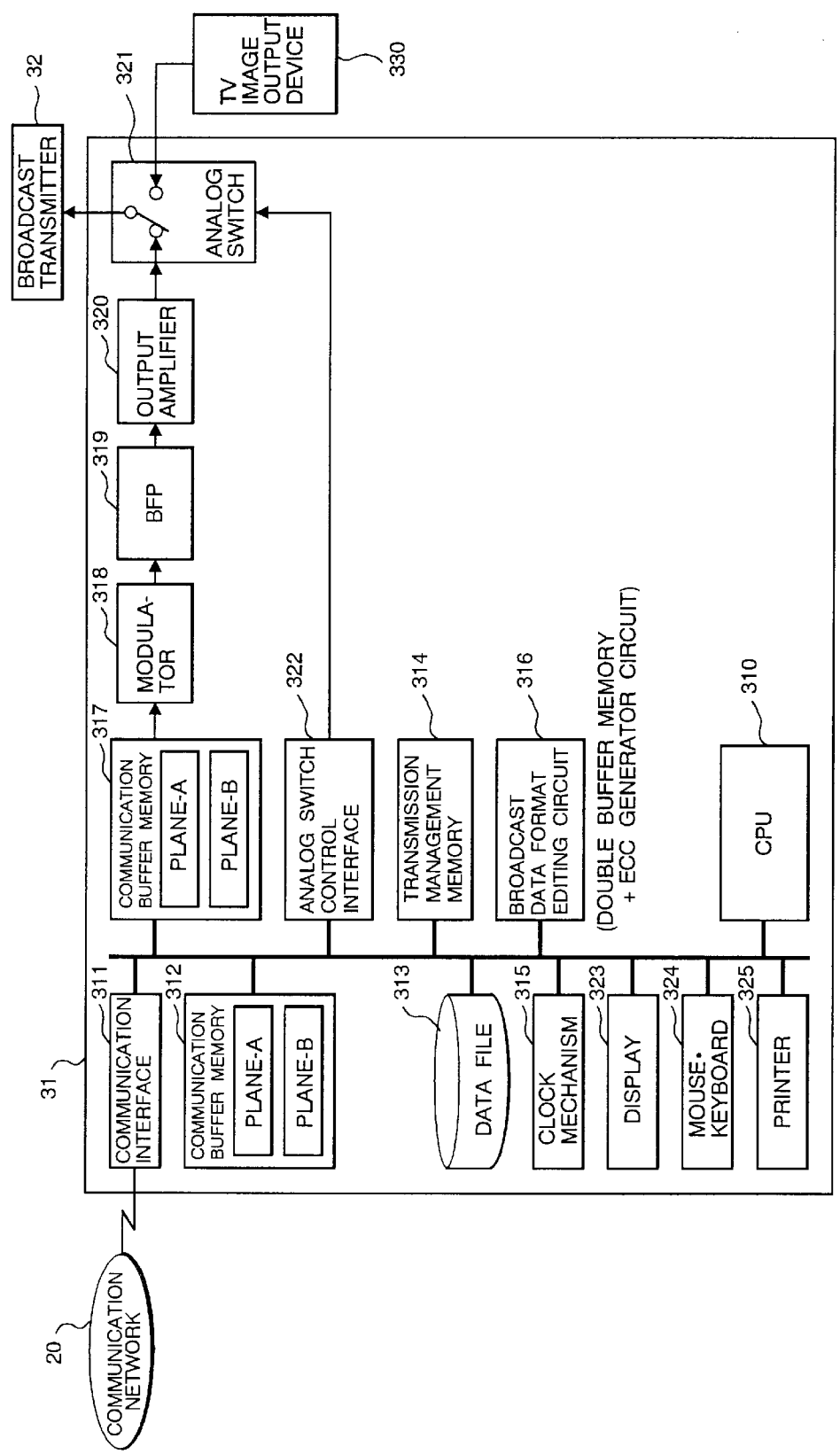
FIG. 11 is a block diagram illustrating a newspaper on-demand transmitting apparatus for analog video signal.
Figure 12:
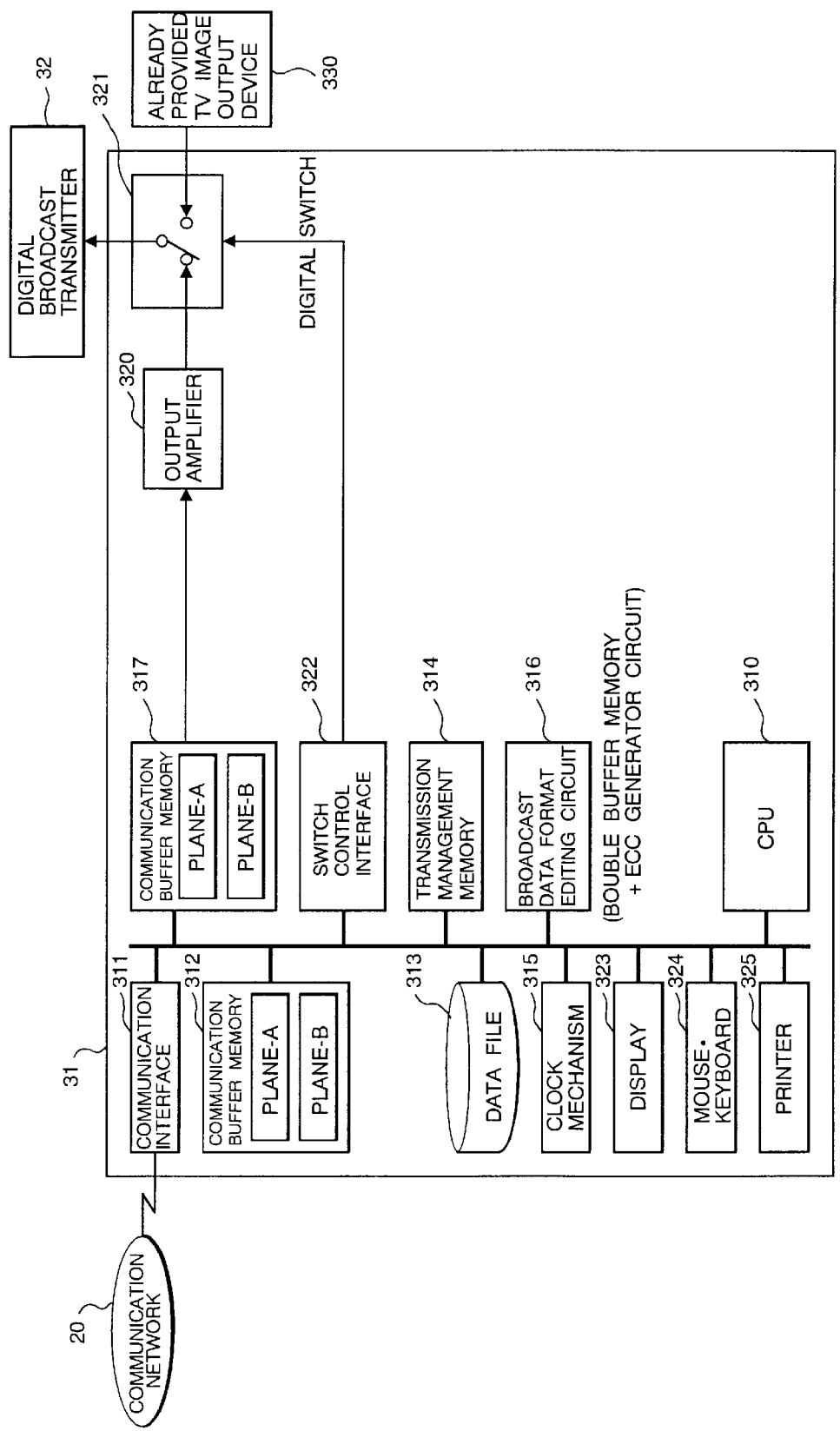
FIG. 12 is a block diagram illustrating a newspaper on-demand transmitting apparatus for digital video signal.

FIG. 11 shows the newspaper on-demand transmitter 31 as used when the broadcast transmitter 32 transmits analog television signals of NTSC (National Television System Committee) scheme or the like. FIG. 12 shows the newspaper on-demand transmitter 31 when the broadcast transmitter 32 transmits digital television signals obtained by compressing analog television signals by MPEG2 (Moving Picture Experts Group 2) scheme or the like. The following description will be made mainly referring to FIG. 11.

In the newspaper on-demand transmitter 31, reference numeral 311 indicates a communication interface which receives newspaper on-demand data supplied from the electronic newspaper page editing and transmitting apparatus 12 of the newspaper on-demand sending system 10 installed in each newspaper company via the communication network 20. This interface uses a communication protocol such as OSI (Open Systems Interconnection), TCP/IP (Transmission Control Protocol/Internet Protocol) or the like. Reference numeral 312 indicates a communication buffer memory for smoothly receiving the newspaper on-demand data coming from each newspaper company to store the same in a data file 313. To be more specific, while the communication buffer memory 313 is receiving the data at its plane-A for example, the data already received on plane-B is transferred to the data file 313 for storage. The data file 313 stores the received on-demand data until a broadcasting time comes. Reference numeral 314 indicates a transmission management memory which extracts and records the control information from the received newspaper on-demand data to use the same to control the transmission of the newspaper on-demand data. Reference numeral 315 indicates a clock mechanism for generating time management information for the broadcasting of the newspaper on-demand data.

Reference numeral 316 indicates a broadcast data format editing circuit for editing the newspaper on-demand data into a broadcast data format. A circuit constitution of this circuit will be described with reference to FIG. 13. The broadcast data format will be described with reference to FIG. 14.

Reference numeral 317 indicates a transmission buffer memory having two planes A and B like the communication buffer memory 312. While the transmission buffer memory 317 is transmitting data from the plane-A for example to a digital modulator 318, the transmission buffer memory captures data coming from the broadcast data format editing circuit 316. The digital modulator 318 digitally modulates a digital signal, output data of the circuit 316, by QPSK (Quadriphase Phase Shift Key) or OFDM (Orthogonal Frequency Division Multiplex) scheme such that the digital signal can be transmitted from the existing broadcast transmitter 32 which transmits analog television signals. The output of the digital modulator 318 is put in a bandpass filter for eliminating a high-frequency component, an output amplifier 320 and to analog switch 321 to be transmitted from the broadcast transmitter 32. Preferably, the broadcast transmitter 32 has a scrambling capability. Reference numeral 330 indicates an existing television image output device.

Like a known digital computer, the newspaper on-demand transmitter 31 has input/output devices such as a display device 323, a mouse/keyboard 324, and a printer 325 in addition to the above-mentioned devices. Further, the on-demand transmitter 31 has a central processing unit CPU 310 for controlling all the above-mentioned devices and circuits of the transmitter 31. Typically, the CPU 310 starts an analog switch controller 322 when a predetermined time comes while checking the clock mechanism 315 and the transmission management memory 314, selects the analog switch 321 to switch the output of newspaper data coming from the transmission buffer memory 317 to the transmitter 32. When the transmission of the newspaper data has been completed, the CPU 310 performs switching from the transmitter 32 to the television image output device 330 for connection.

If the transmitter 32 is digital, the capabilities implemented by the digital modulator 318 and the bandpass filter 319 of FIG. 11 are contained in itself, so that these modulator and bandpass filter need not be provided. Consequently, the output of the transmission buffer memory 317 is directly sent to the digital switch 321 through the output amplifier 320 to be switched to the transmitter 32.

Referring to FIGS. 11 and 12, the broadcast transmitter 32 preferably has a scrambling capability.

In what follows, a broadcast data format will be described.

Figure 13:
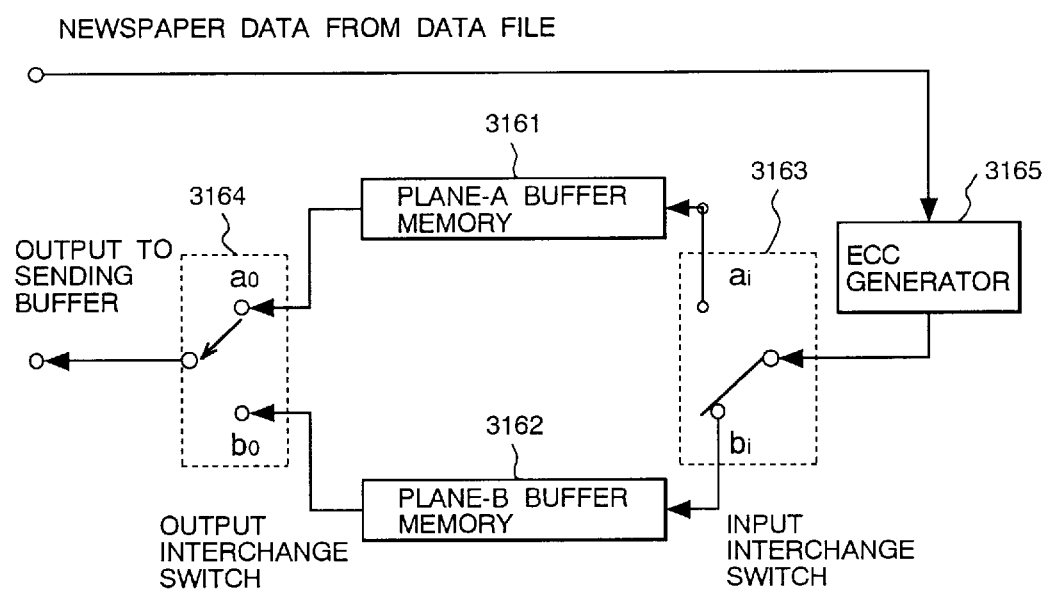
FIG. 13 is a block diagram illustrating a newspaper on-demand broadcast data format editing circuit.

FIG. 13 shows a block diagram illustrating a circuit constitution of the broadcast data format editing circuit 316 of FIGS. 11 and 12. The circuit 316 comprises a plane-A buffer memory 3161, a plane-B buffer memory 3162, an input interchange switch 3163, an output interchange switch 3164, and an ECC (Error Checking and Correction) generator 3165. A particular area in the plane-A buffer memory 3161 is stored with a newspaper on-demand broadcast begin code and other particular areas in the plane-A buffer memory 3161 and the plane-B buffer memory 3162 are stored with a newspaper on-demand broadcast end code.

Figure 14:
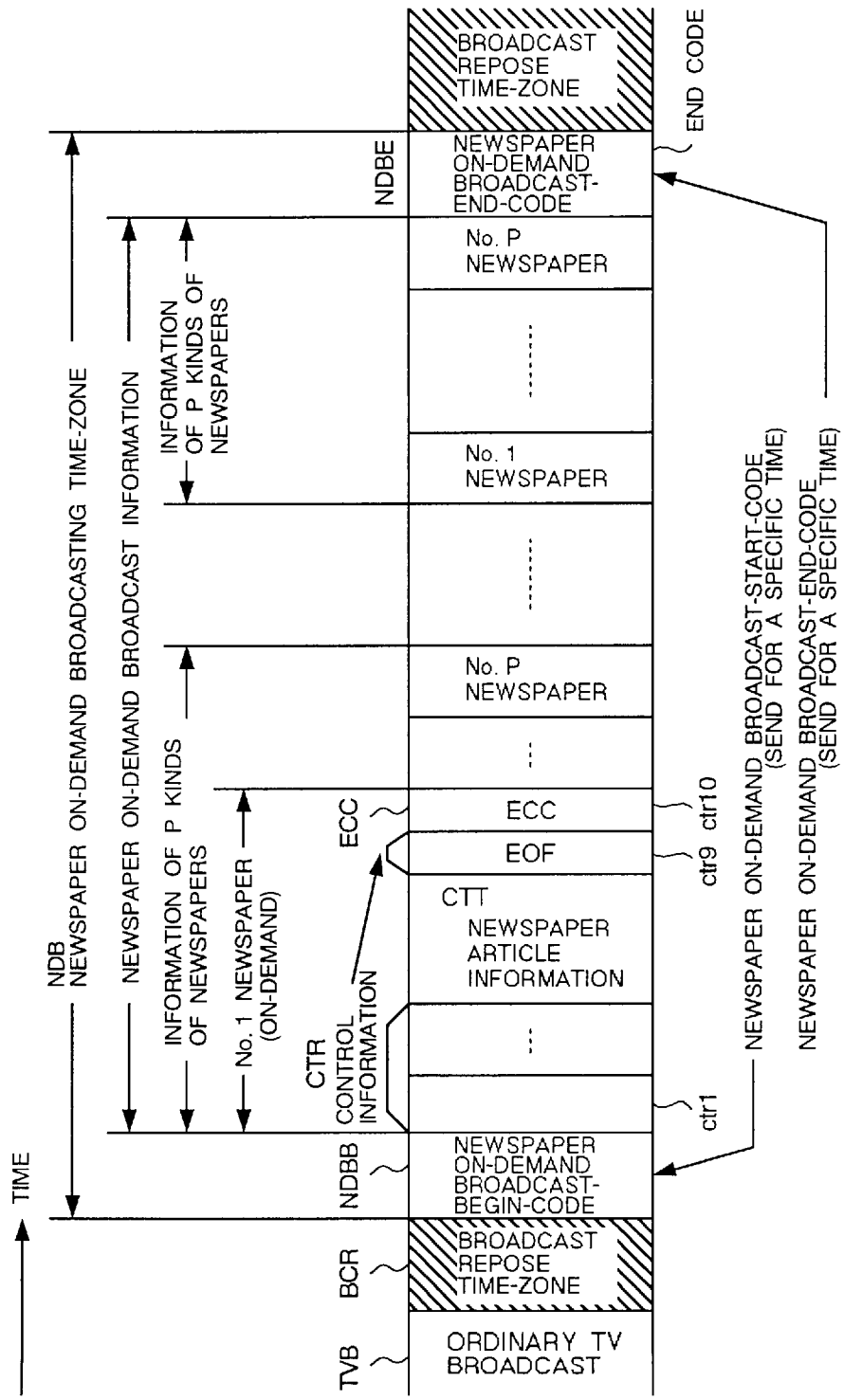
FIG. 14 shows a format of newspaper on-demand broadcast data.

FIG. 14 shows a newspaper on-demand broadcast data format. As shown in the figure, when a normal telecasting ends or when a times comes at which newspaper on-demand broadcast starts, a broadcast repose BCR occurs, starting the preparation for connecting the newspaper on-demand transmitter 31 to the input of the transmitter 32. At this moment, the output interchange switch 3164 of the broadcast data format editing circuit 316 is switched to the ao side, outputting a newspaper on-demand broadcast begin code NDBB from the plane-A buffer memory 3161.

On the other hand, the B-plane buffer memory 3162 is stored with newspaper data from the data file 313 via the ECC generator 3165 and the side bi of the input interchange switch 3163. That is, in the example of FIG. 12, the newspaper on-demand data of newspaper No. 1 among P kinds of newspapers are read from the data file 313 to be sequentially stored in the plane-B buffer memory 3162. The ECC generator 3165 counts these read data to continue generating ECC codes. When the newspaper data of the newspaper No. 1 have all been read out with the detection of an EOF code, the ECC generator 3165 sends the generated ECC codes to the plane-B buffer memory 3162 and initializes itself.

When the newspaper on-demand broadcast begin code NDBB has been read from the plane-A buffer memory 3161 for a certain duration of time, the CPU 310 sets the output interchange switch 3164 to the bo side, beginning the transmission of the data of the newspaper No. 1. Then, the CPU 310 sets the input interchange switch 3163 to the ai side to connect the ECC generator 3165 to the plane-A buffer memory 3161, beginning reading the data of the newspaper No. 2.

Thus, when the first transmission of data of the newspaper No. 1 through No. P has been completed while alternating the plane-A buffer memory 3161 and the plane-B buffer memory 3162, the second transmission starts by returning to the newspaper No. 1.

When the newspaper data of P kinds of newspapers have been transmitted by the specified number of times, the newspaper on-demand broadcasting comes to an end. At this moment, the CPU 310 sets the output interchange switch 3164 to the buffer memory opposite to the buffer memory with the final data broadcasting ended, continuing reading the newspaper on-demand broadcast end code NDBE from a predetermined memory area. When the code NDBE has been transmitted for a certain duration of time, the CPU 310 switches the switch 321 through the switch control interface 322 to disconnect the newspaper on-demand transmitter 31 from the transmitter 32.

Figure 15:
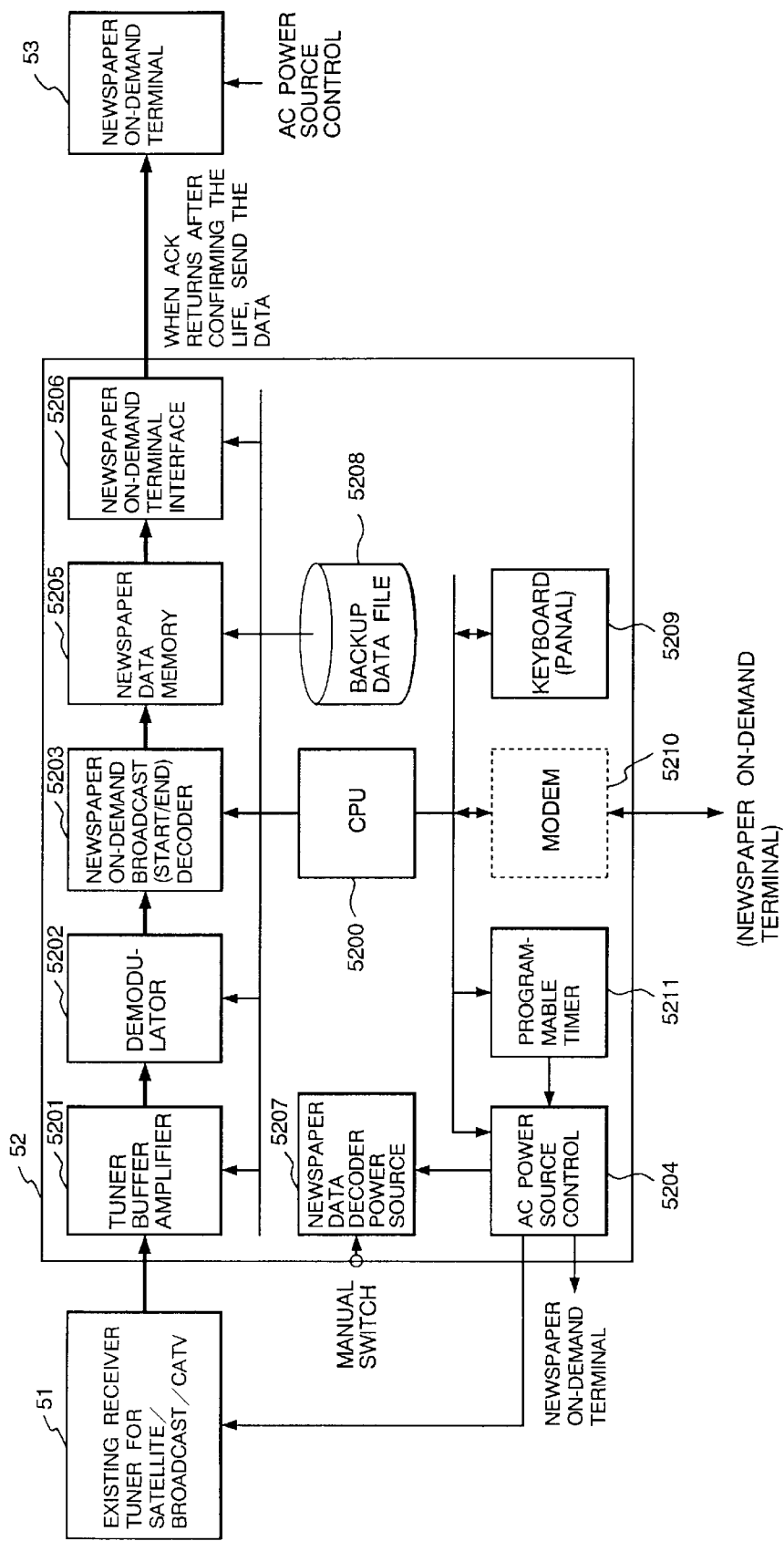
FIG. 15 is a block diagram illustrating a newspaper data decoder.

Thus, the newspaper on-demand data transmitted from the broadcast sending station 30 are received by home and office 50 of FIG. 2 to be entered in the newspaper data decoder 52 of FIG. 15 via the receiver tuner 51.

The receiver tuner can be implemented by an exsisting tuner having a descrambling capability. Therefore, a descrambled signal equivalent to a television base band signal is entered in the newspaper data decoder 52.

In the newspaper data decoder 52, the above-mentioned signal is automatically-gain-controlled (AGC) to a predetermined voltage level by a tuner buffer amplifier 5201 to be entered in the demodulator 5202. In the demodulator 5202, the signal is demodulated according to the transmission modulating used. If the signal is demodulated to newspaper on-demand data, the signal becomes the digital signal having the format of FIG. 14. Otherwise, the signal becomes a noise.

A newspaper on-demand broadcast begin/end decoder 5203 always monitors the output of the demodulator 5202. When the newspaper on-demand broadcast begin code NDBB is detected, the decoder 5203 starts an AC power source control 5204 via a CPU 5200, thereby starting the AC power source of the newspaper on-demand terminal 53 and, at the same time, initializing necessary circuits such as a newspaper data memory 5205 and a newspaper on-demand terminal interface 5206.

On the other hand, if a newspaper on-demand broadcast end code NDBE is detected, the CPU 5200 turns off a power source 5207 of itself, an AC power source of the tuner 51, and the AC power source of the newspaper on-demand terminal 53 when the transfer of the received data to the newspaper on-demand terminal 53 has been normally completed.

Also, the newspaper on-demand broadcast begin/end decoder 5203 transmits the newspaper on-demand broadcast data of FIG. 14 to a newspaper data memory 5205 after receiving the newspaper on-demand broadcast begin code NDBB. The newspaper data memory 5205 is a speed matching buffer for transmitting the received data to the newspaper on-demand terminal 53 without delay.

Following the initializing processing performed after receiving the newspaper on-demand broadcast begin code NDBB, the newspaper on-demand terminal interface 5206 enters the procedure of data transfer with the newspaper on-demand terminal 53 under the control of the CPU 5200, starting the transmission of the received data only when the interface 5206 has received an acknowledgment from the newspaper on-demand terminal 53 that normal communication is enabled.

If a response telling abnormalcy comes or no response comes at all from the newspaper on-demand terminal 53, the newspaper on-demand terminal interface 5206 stores the received data into a backup data file 5208 under the control of the CPU 5200. Then, the interface 5206 issues a communication start (or data transfer) request to the newspaper on-demand terminal 53 at certain time intervals. When an acknowledgment comes from the terminal 53, the interface 5206 transfers the received data from the backup data file 5208 to the terminal 53 under the control of the CPU 5200.

When the CPU 5200 detects the newspaper on-demand broadcast end code NDBE, the interface 5206 enters the procedure for ending the data transfer with the terminal 53, thereby ending the data transfer.

The CPU 5200 not only controls the newspaper data decoder 52 in its entirety, but also sets a receive start time to a programmable timer 5211 when the receive start time is entered from directly from a keyboard 5209 or from the newspaper on-demand terminal 53 via a modem 5210. When a predetermined time comes, the programmable timer 5211 gives a system activation trigger to the CPU 5200 if the newspaper data decoder 52 is in the sleep state and, at the same time, controls the AC power source control 5204 to power on the receiver tuner 51 and the newspaper on-demand terminal 53.

Figure 16:
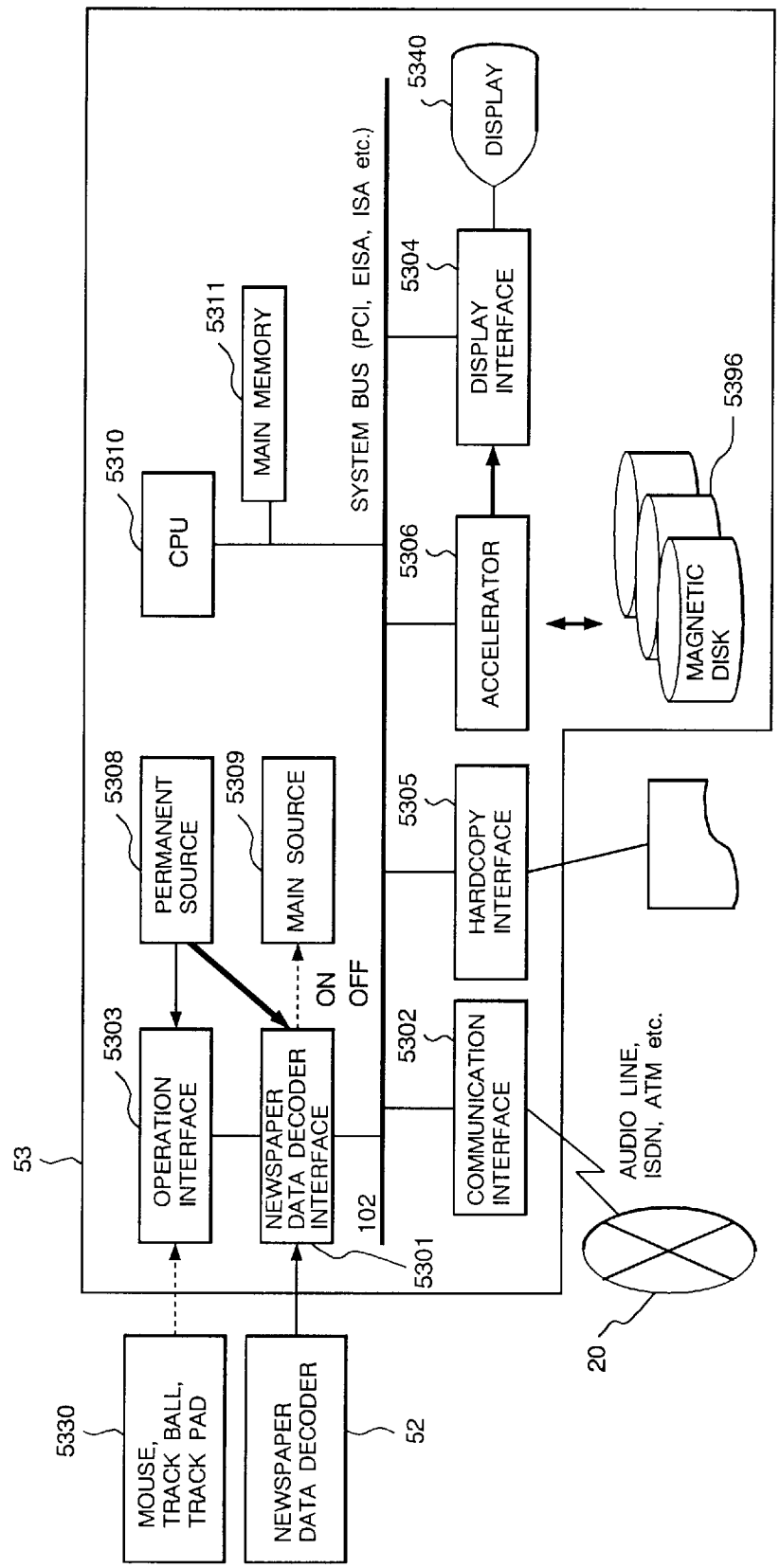
FIG. 16 is a block diagram illustrating a newspaper data terminal.

Next, the newspaper on-demand terminal 53 will be described. FIG. 16 shows is a block diagram illustrating a hardware constitution of the newspaper on-demand terminal 53. The newspaper on-demand terminal 53 comprises a newspaper data decoder interface 5301 for transferring data with the newspaper data decoder 52 of FIG. 15, a communication interface 5302 for transferring data with the communication network 20, an operation interface 5303 connected to an operation input device 5330 such as a mouse, track ball or track pad, a display interface 5304 for a display device 5340 such as a CRT, and a hardcopy interface 5305 for a printer or a facsimile device.

The newspaper data decoder interface 5301 is implemented by a high-speed bit-serial interface, for example, an interface based on a low-cost optical fiber used in a satellite television receiver or an audio unit. However, it will be apparent for those skilled in the art that the interface 5301 may also be implemented a parallel interface such as an SCSI (Small Computer System Interface) used for interfacing a disk drive. As will be described, the interface 5301 also has an interface for a signal that controls a main power source such that the newspaper on-demand terminal 53 can receive newspaper data from the newspaper data decoder 52.

The communication interface 5302 provides interface with the communication network 20. The communication network 20 is implemented physically by an audio telephone line network, an ISDN (Integrated Services Digital Network), an ATM (Asynchronous Transfer Mode) network or a CATV (Cable Television) network. The network 20 may include an wireless line in addition to wired lines. A communication protocol used between the communication interface 5302 and the communication network 20 may be implemented by the standard IP (Internet Protocol) or OSI (Open Systems Interconnection). The communication interface 5302 permits the reception of newspaper data via not only the newspaper data decoder 52 but also the network 20. In addition, the communication interface 5302 permits not only the reception of newspaper data but also the requests of services from user to information provider including the request for the transmission of newspaper data, the reservation and continuation of subscription, and the request for detailed information and the ordering of goods linked with advertisements.

Figure 17:
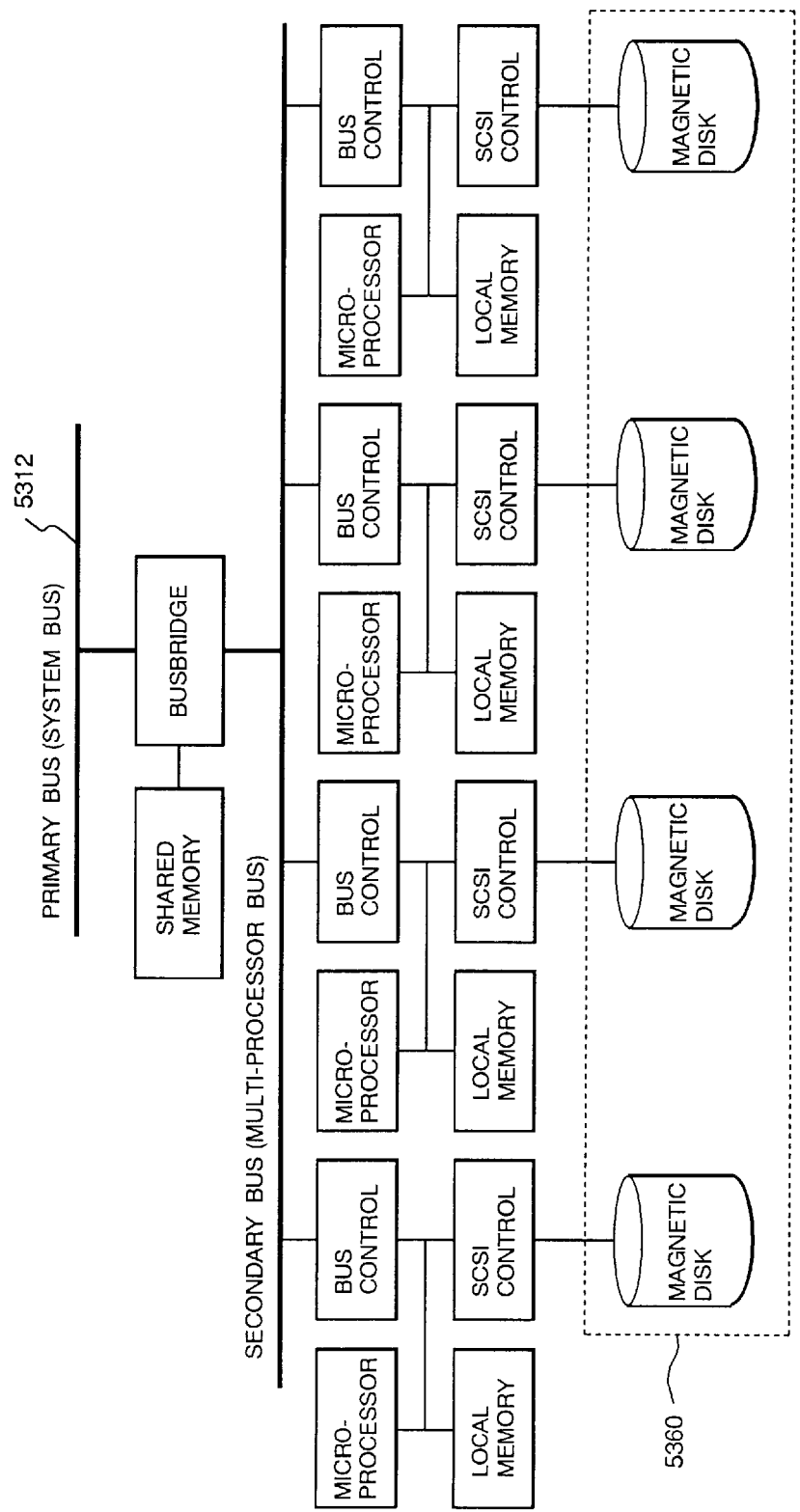
FIG. 17 is a block diagram illustrating an accelerator used in the newspaper data terminal.

The newspaper on-demand terminal 53 has an accelerator 5306 for controlling magnetic disks 5360 for storing newspaper data to perform high-speed image processing as shown in FIG. 17. A detailed constitution of the accelerator 5306 is shown in FIG. 17. As shown, the accelerator 5306 is connected to a system bus 5312 of FIG. 16 via a bus bridge and has multiple processors for controlling the magnetic disks 5360 in parallel and at relatively high speed.

Referring to FIG. 16 again, the interfaces 5301 through 5305 and the accelerator 5306 are connected to the system bus 5312 together with a CPU 5310 for controlling the entire newspaper on-demand terminal in cooperation with a main memory 5311. It will be apparent for those skilled in the art that if the CPU 5310 is a high-speed and high-performance CPU, the CPU 5310 can be adapted to emulate the processing of the accelerator 5306, thereby making it unnecessary to install the same.

The newspaper on-demand terminal 53 has two power sources; a permanent power source 5308 and a main power source 5309. Sections such as the newspaper data decoder interface 5301 and the operation interface 5303 are supplied with permanent power from the permanent power source 5308. The other sections are connected to the main power source 5309. The main power source 5309 is turned on/off by the activation signal coming from the newspaper data decoder 52 or a remote controller, not shown.

In what follows, a software constitution of the newspaper on-demand terminal 53 will be outlined, details thereof being described later.

Figure 22:
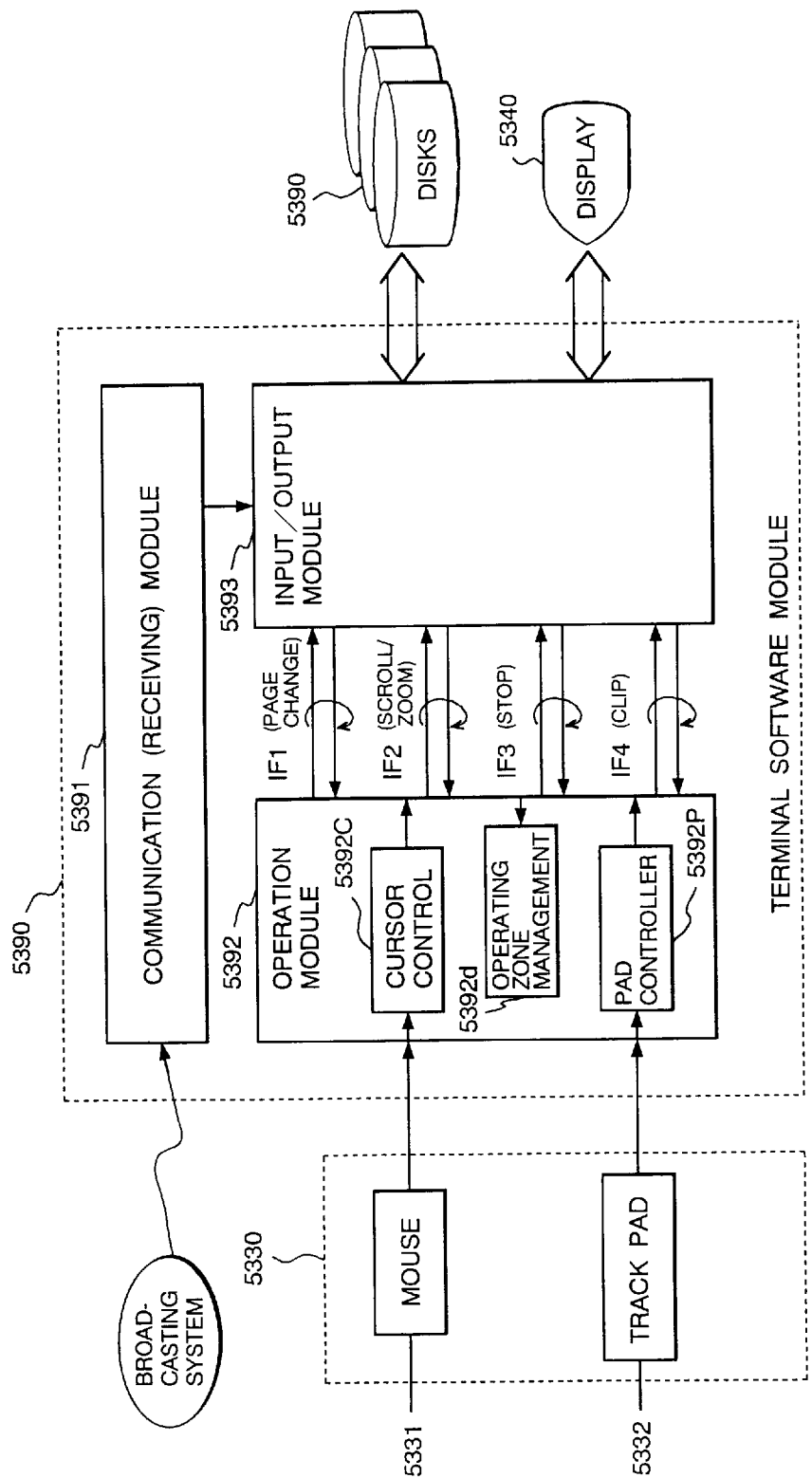
FIG. 22 is a block diagram illustrating a software module of the newspaper data terminal.

Referring to FIG. 22, software 5390 of the newspaper on-demand terminal 53 comprises a communication software module 5391 for performing communication with the newspaper data decoder 52 and the network 20, an operation software module 5392 for accepting operation instructions, and an input/output software module 5393 for storing newspaper data into or reading the same from a magnetic disk and displaying the data on a display device. The operations performed by these software modules and the above-mentioned hardware will be described below.

Figure 18:
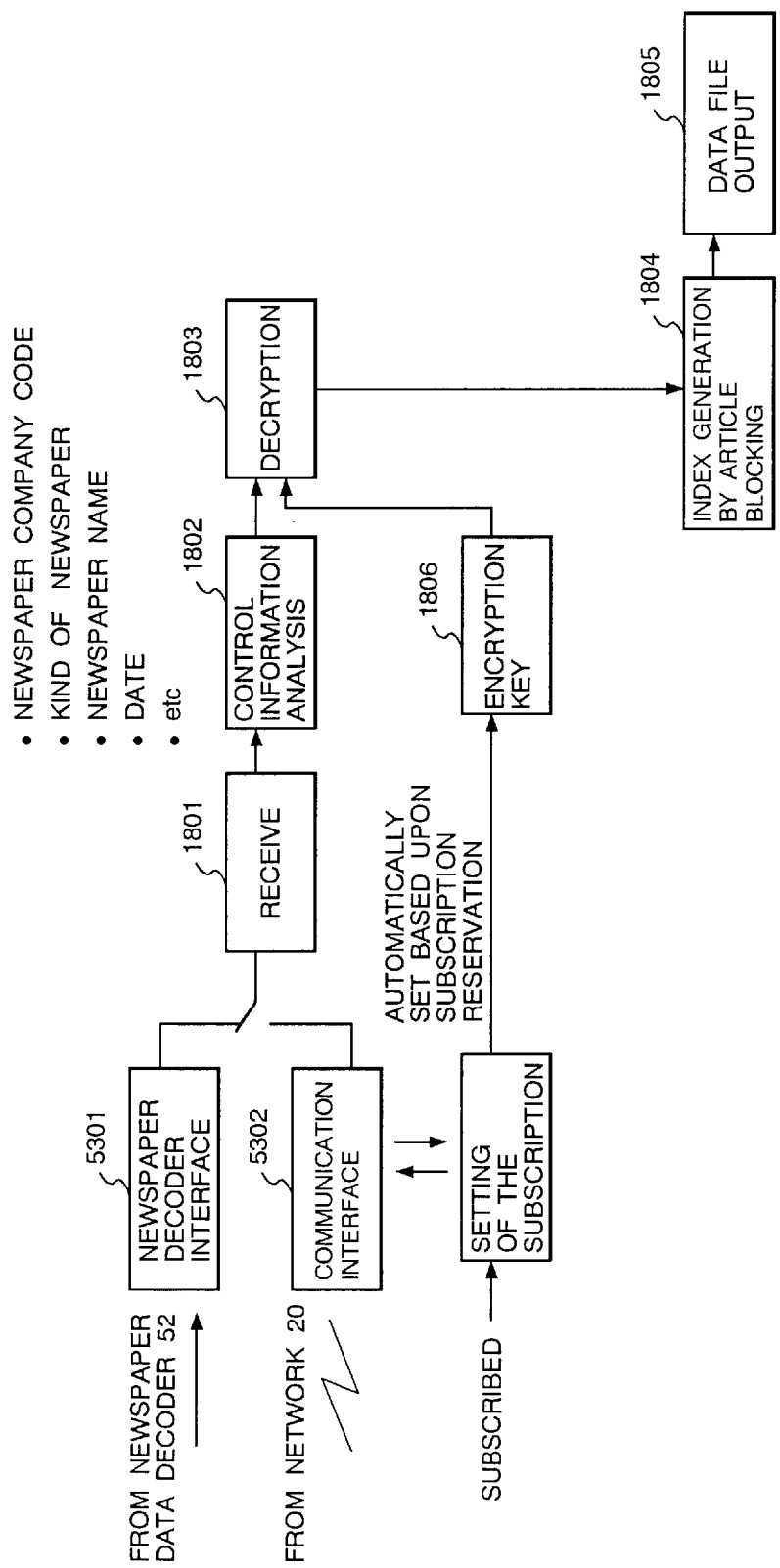
FIG. 18 is a block diagram illustrating the receive processing of the newspaper data terminal.

First, how newspaper data are received and processed will be described. FIG. 18 shows a block diagram illustrating newspaper data receiving and processing processes.

Reception 1801 of newspaper data from the newspaper data decoder 52 is basically the file transfer with source and destination fixed. Therefore, the protocol for receiving data from the network 20 is applicable and the fourth layer of the seven-layer model of the above-mentioned OSI protocol, namely the transport layer, and the layers below the same can be implemented by the newspaper data decoder interface 5301 and its driver interface. Physically, the reception of newspaper data is performed by using a receiver buffer having tow planes of A and B in generally the similar manner as described in FIGS. 9 and 11.

Figure 19:
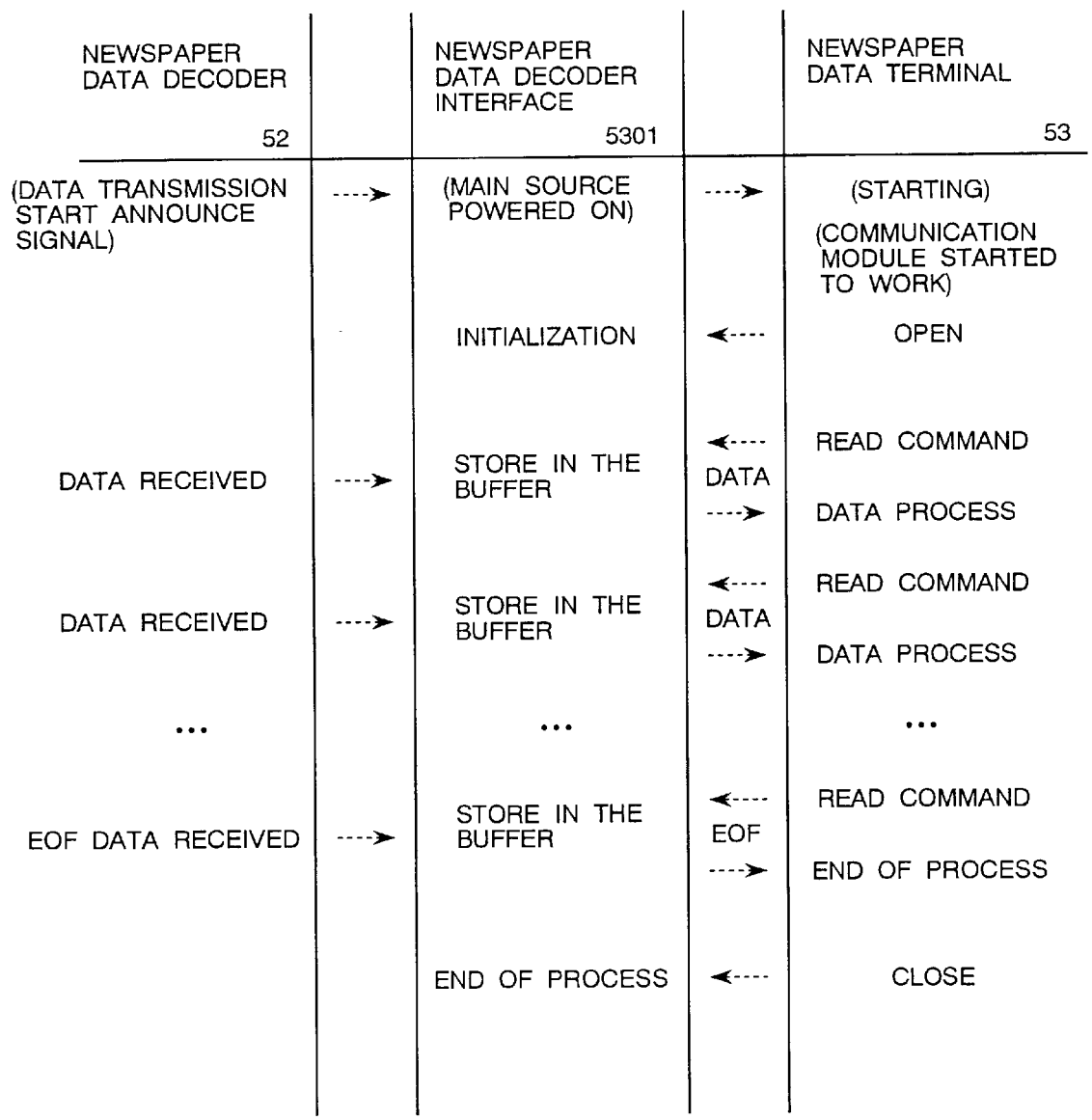
FIG. 19 shows a procedure of the receiving processing of the newspaper dada terminal.

FIG. 19 is a diagram illustrating the flow of processing for receiving newspaper data. On receiving data transmission start announce signal by broadcasting or detecting a data transmission time by an internal timer, the newspaper data decoder 52 turns on the main power source 5309 of the newspaper on-demand terminal 53 via the newspaper data decoder interface 5301 of FIG. 18 to start the communication software module 5391 of FIG. 22 of the newspaper on-demand terminal 53. The communication software module 5391 issues an open command to the newspaper data decoder 52 and then issues a read command. Data coming from the newspaper data decoder 52 are held in a receiver buffer in the decoder 52 before being passed to the newspaper on-demand terminal 53 according to the read command. The newspaper on-demand terminal 53 performs analysis or storage according to the type of the received data. This processing will be described later. The communication software module 5391 repeats command issuance and data processing until the newspaper data have been all received. When the reception of the entire data has ended with EOF data received, the communication software module 5391 performs receive end processing, issuing a close command to the newspaper data decoder 52. Because the capability of the newspaper data decoder interface 5301 is used via a driver, the actual processing divided between the driver and the newspaper data decoder interface 5301.

Along with the above-mentioned reception of newspaper data, the newspaper on-demand terminal 53 processes the received data. The data received by the execution of the communication software module 5391 are composed of packets each having a header as described with reference to FIG. 6; eventually, these received data as a whole can be regarded as file data. The communication software module 5391 performs, on the received data, control information (header) analysis 1802, decryption 1803, index generation by article blocking 1804, and data file output 1805 in which the data file is outputted to the input/output software module 5393 (FIG. 22) as shown in FIG. 18. In the control information (header) analysis 1802, information such as newspaper company name, type of newspaper, newspaper name, date of issue, distinction between morning paper and evening paper, and edition number are identified based on the control information attached at the head of the received newspaper data. It should be noted that the encryption key necessary for the decryption processing 1803 is preset by the automatic setting for example effected reserved subscription contract.

When the data file output 1805 is performed, the input/output software module 5393 of FIG. 22 stores the processed received newspaper data in the disks 5360 via the accelerator 5306.

Next, the usage, or the viewing of the received newspaper data will be described.

Figure 20:
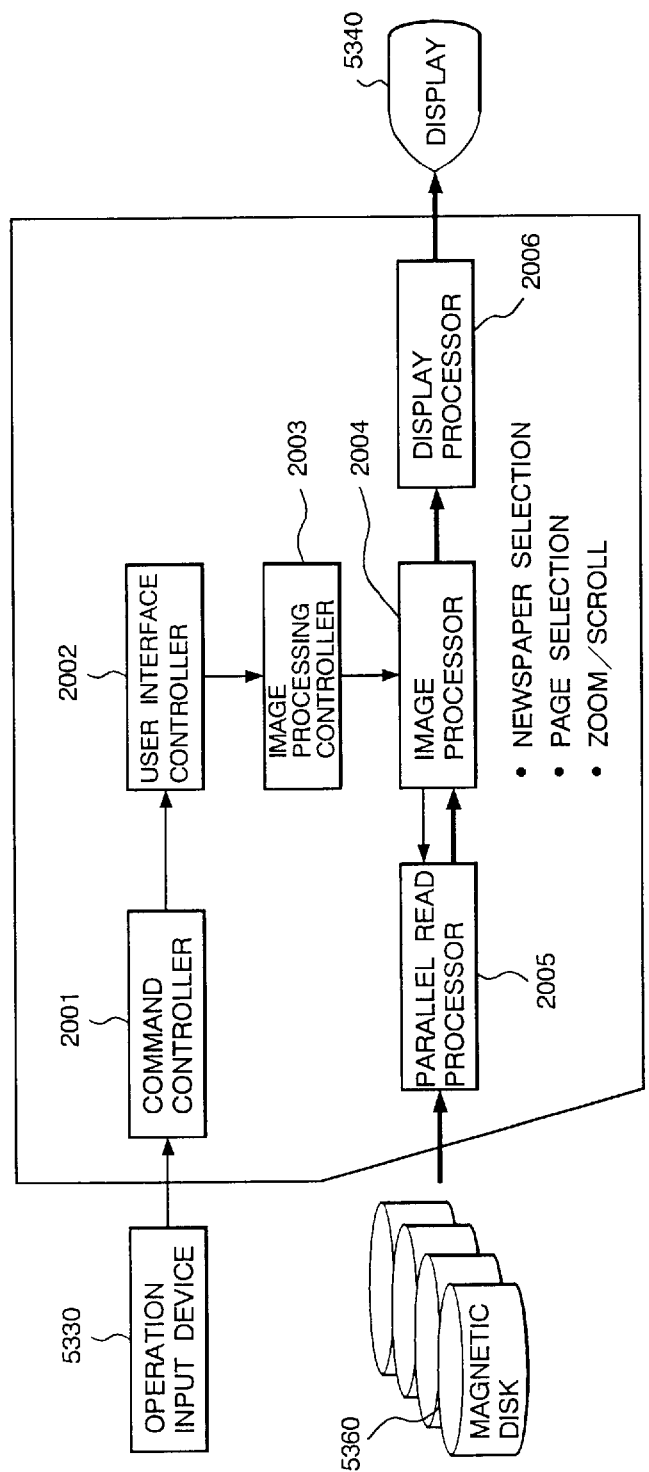
FIG. 20 is a block diagram illustrating the viewing processing of the newspaper data terminal.

FIG. 20 shows a block diagram illustrating the processing by the newspaper on-demand terminal 53 for viewing electronic newspapers. In operation, a command entered from an operation input device 5330 is interpreted in a command controller 2001. The result of the interpretation is sent to a user interface controller 2002 to be entered in an image processing controller 2003. An image processor 2004 performs image processing on the data read from the magnetic disks 5360 by a parallel read processor 2005 to send the processed data to a display processor 2006. The resultant data are displayed on the display device 5340.

Figure 21:
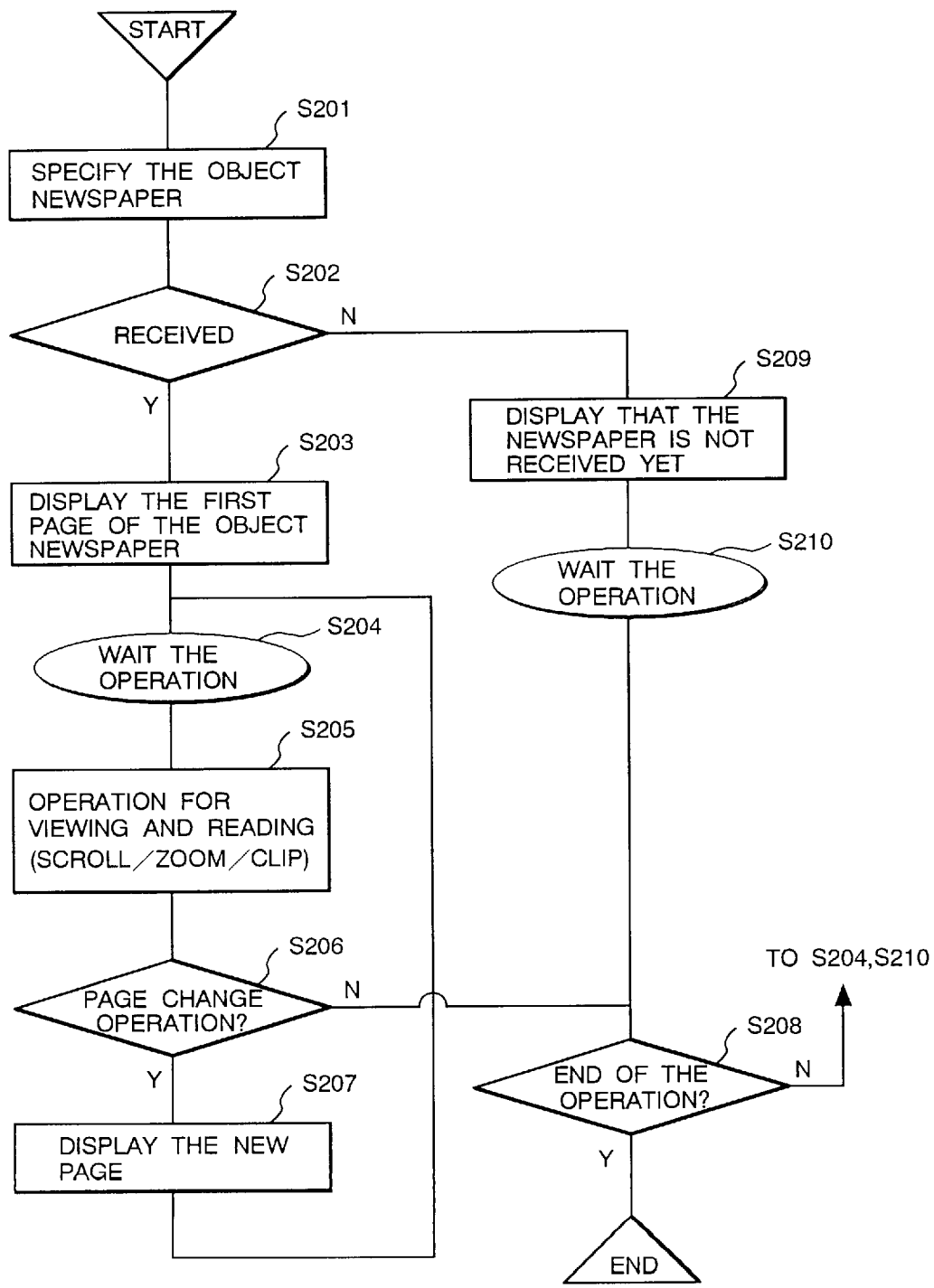
FIG. 21 is a flowchart indicating the viewing processing of the newspaper data terminal.

FIG. 21 shows an outline of the processing of viewing and reading an electronic newspaper. First, a user, namely a reader operates the newspaper on-demand terminal 53 to set a newspaper to be viewed and read (step 201). If the newspaper data of this newspaper have already received (step 202), the terminal 53 displays, in low magnification, page 1 of the newspaper on its display device 5340 (step 203) and waits for a viewing and reading operation by the user (step 204). The user views over the articles of page 1 displayed in low magnification, scrolls, zooms and/or clips a desired article (step 205), and displays the desired article thus obtained on the display device in high magnification for acquiring details of the article. Further, if required, the user can change pages (step 206) to display a new page to continue viewing and reading. Thus, the user can view and read an electronic newspaper in generally similar sense in which the user reads a paper-based newspaper.

When the user ends the viewing and reading and performs an end operation (step 208), the above-mentioned viewing and reading processing comes to an end.

If no newspaper data have been received in step 202, the newspaper on-demand terminal 53 displays information thereof (step 209) and waits for an operation by the user (step 210).

In the above-mentioned flow of the processing of electronic newspaper viewing and reading, one of the features of the present invention is that the user can change pages, and scroll, zoom, and/or clip newspaper articles on the display device as if the user handles a paper-based newspaper while displaying the electronic newspaper on the display device. In what follows, this feature will be described in detail.

As shown in FIG. 22, the viewing and reading of an electronic newspaper is achieved by displaying it on the display device 5340 by the software 5390 of the newspaper on-demand terminal 53 based on a command entered by the user at the operation input device 5330. To be more specific, this viewing and reading is achieved by commands issued from the operation software module 5392 to the input/output software module 5393 for performing interface between the operation software module 5392 and the input/output software module 5393 that controls the display device 5340, responses to the commands by the input/output software module 5393 to the operation software module 5392.

Referring to FIG. 22, a cursor-type input device such as a mouse or track ball and a track-pad input device are used, by way of example, for the operation input device 5330 suitable for the electronic newspaper viewing and reading according to the present invention. The use of the mouse or track ball is advantageous because of their known wide use in personal computers and the like and their ease of improvement in the future. The use of the track pad is advantageous especially for senior people for example because it is provided with a variety of operation buttons for intuitive and therefore easy operation of the terminal to be described later.

The operation software module 5392 is provided with a cursor control module 5392c and a track pad control module 5392p for supporting the cursor-type input device 5331 and the track-pad input device 5332 respectively, each of these modules issuing a command to the input/output software module 5393. A response to the command is processed by an operation zone management 5392d in the display.

In what follows, viewing and reading operations such as page changing, scrolling, zooming, and clipping will be described.

First, the page changing, scrolling, zooming, and clipping by cursor-type input device will be described with reference to FIGS. 23 and 24.

Figure 23:
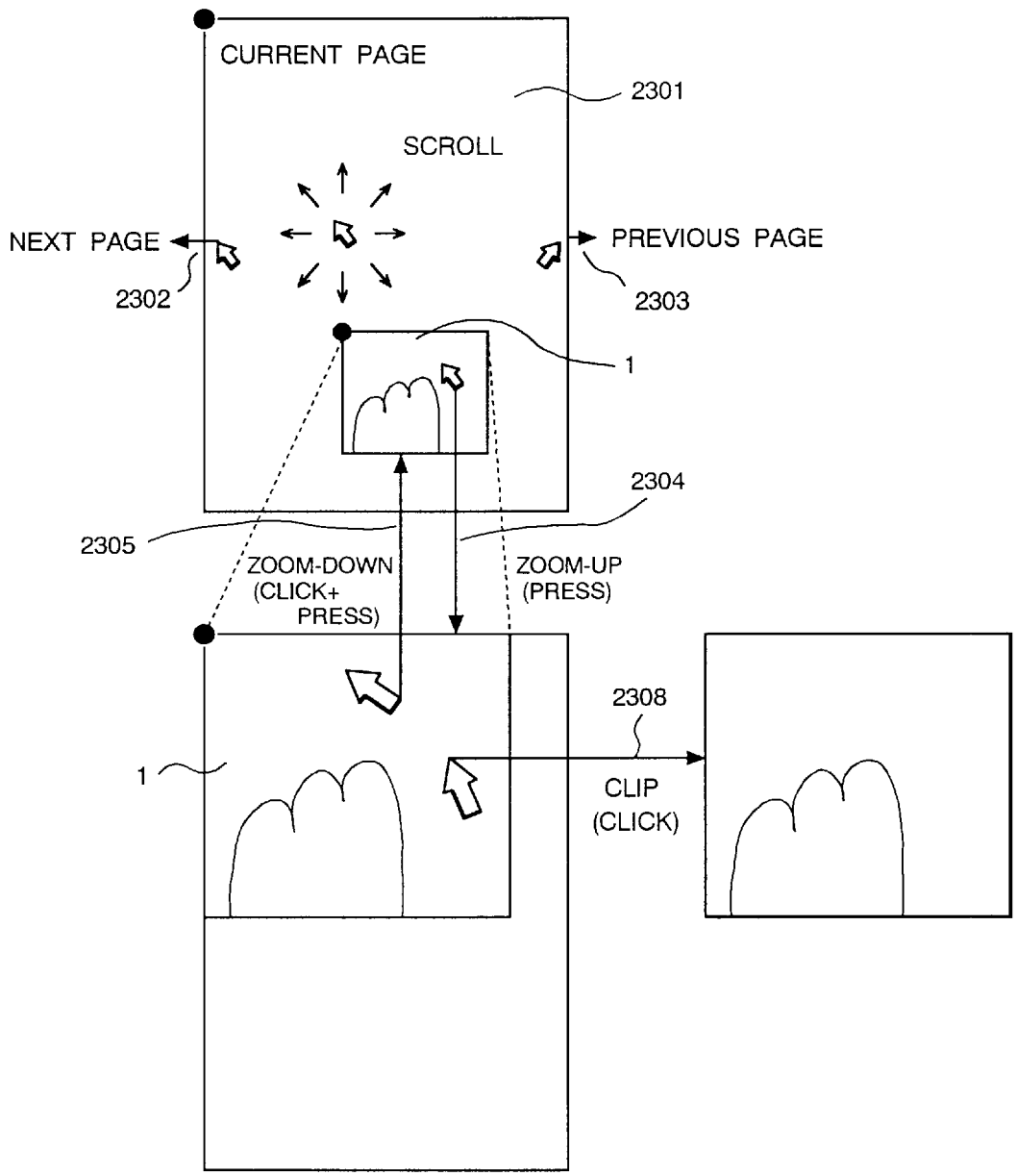
FIG. 23 shows a display screen explaining an example of the viewing processing by a cursor input device.

FIG. 23 shows a display screen indicating the viewing and reading operations based on the cursor-type input device.

(1) Scrolling and page changing

When a cursor (a white arrow in the figure) is moved toward outside of the screen, the screen is scrolled such that an article in the current page in the direction of the cursor appears in the screen (2301). This is as if a window moved around over a newspaper. The screen is scrolled as fast as the cursor is moved. When the upper or lower end of the current page is reached, the vertical scroll is stopped. The screen can be scrolled horizontally forward for a next page 2302 and backward for a previous page 2303.

(2) Zooming

The page can be zoomed up (2304) by keeping the mouse pressed (this operation is called pressing hereinafter) and zoomed down (2305) by clicking and pressing the mouse. With an upper left point for example in the screen fixed, zooming speed is increased by pressing; if the pressing is very quick, the screen jumps to a particular magnification ratio.

(3) Clipping

The cursor is positioned inside an article I and the mouse is clicked (2306). This clips the article I. To stop clipping, the mouse is double-clicked in the article I. Thus, to control the clipping, correspondence must be provided between a given point on the page and an article number, one to one. The following describes a method of providing the correspondence.

Generally, a newspaper article has an unfixed form. One article may take a rectangular form having more than four right-angle corners. A method of FIGS. 29 through 32 is significantly effective in solving the clipping of such an article.

Figure 29:
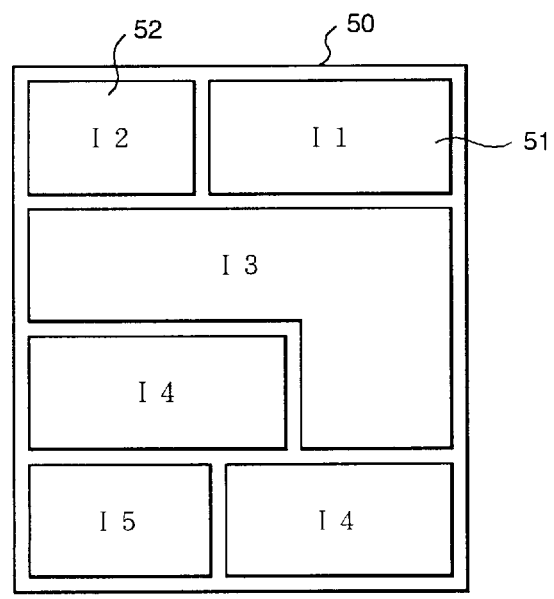
FIG. 29 shows a layout of page 1 of the newspaper of FIG. 4.

Referring to FIG. 29, the page 1 of the newspaper of FIG. 4 (A) has articles I1 through I5. First, it is assumed that the actual size of one page of the newspaper is 40 cm wide and 54 cm high. Dividing this page at intervals of 1 cm vertically and horizontally result in a matrix composed of 40 times 54 divided areas. These areas are numbered, starting from the upper left corner, (1, 1), (1, 2), . . . (54, 40) as shown in FIG. 30. The resultant matrix is superimposed over the page 1 of the newspaper of FIG. 29. Assigning the small areas with corresponding article numbers results in a matrix of FIG. 31.

Figure 32:
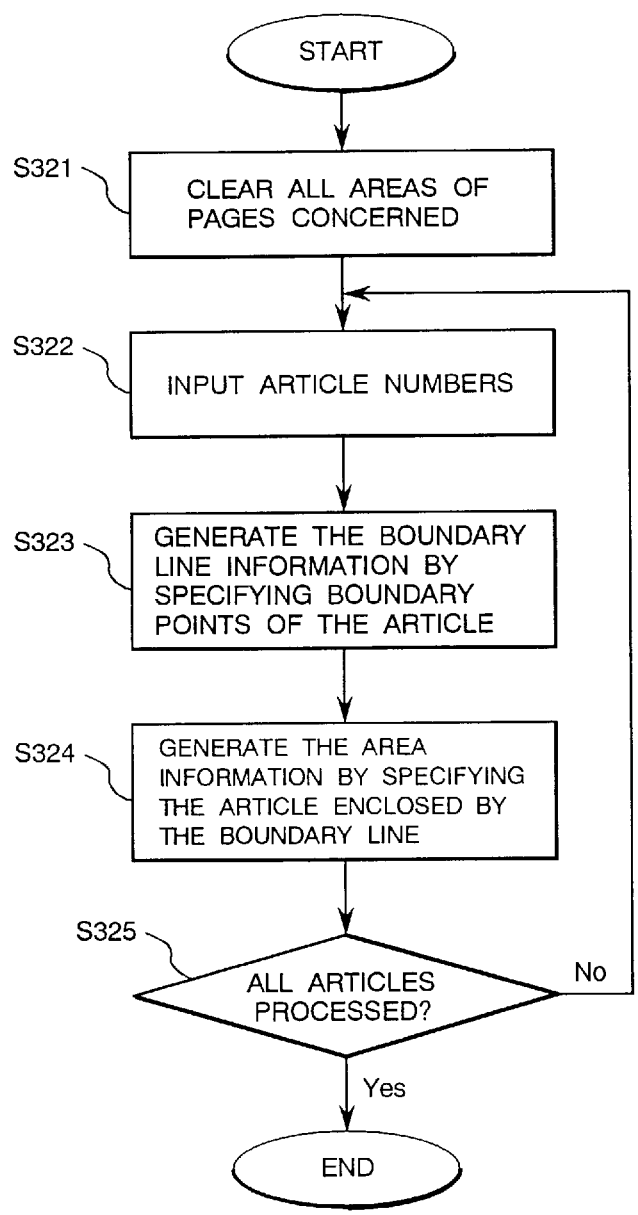
FIG. 32 is a flowchart indicating the creating of the article boundary information.

The assignment of article numbers is actually performed by the electronic newspaper page editing and transmitting apparatus 12 according the processing flow of FIG. 32. To be specific, all areas of the page concerned are cleared (step 321), article numbers are entered article by article (step 322), boundary line information is generated by assigning "0" to small areas including a boundary line of the article (step 323), and, because the small areas enclosed by the boundary line are located inside that article, the number of that article is assigned to all the enclosed small areas (step 324).

Thus, when a small area is designated, the corresponding article number is known and the article belonging to that number can be obtained, thereby enabling clipping of that article. The clipping operation will be described later in detail.

Going back to the description of the electronic newspaper viewing and reading operation based on the cursor-type input device, it is desired in the operations of (1) and (3) above that the cursor appears on the screen upon starting the operation and disappears from the screen upon ending the operation.

If the cursor-type input device is used as shown in FIG. 22, scrolling, page changing, zooming and other operations than clipping can be performed by pointing a menu bar 2400 displayed in the screen with the cursor. To be specific, clicking or pressing the menu bar at scroll 2401, page change (next page) 2402, page change (previous page) 2403, zoom up 2404, zoom down 2405, newspaper name (next) 2408, newspaper name (previous) 2409, date (next) 2410, or date (previous) 2411 provides a desired effect. For page change, newspaper name change, and date change, clicking provides update on a one by one basis and pressing provides continuous update.

Figure 25:
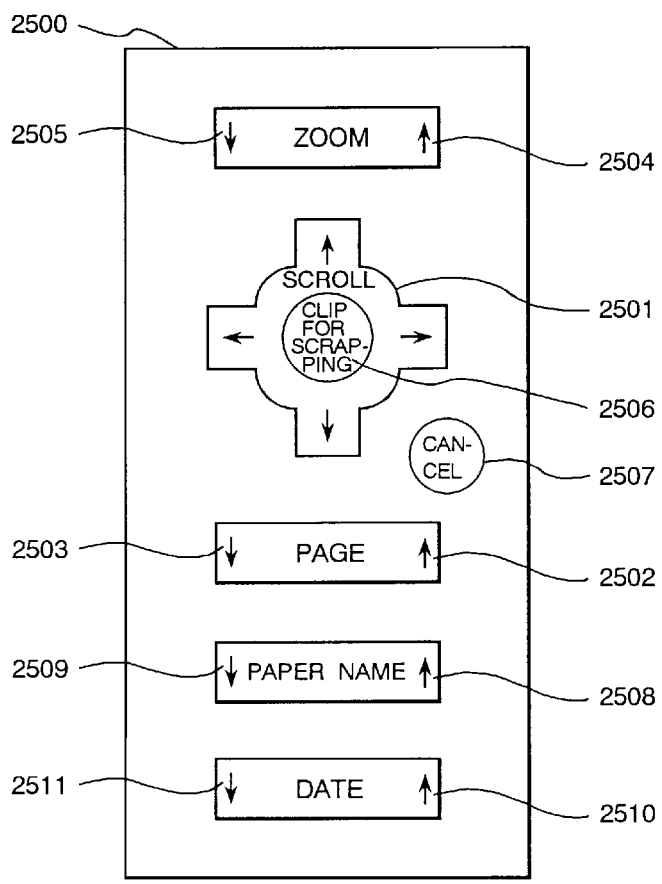
FIG. 25 is a flat view illustrating an example of a dedicated pad-type input device.

The following describes operation input operations based on the track-pad input device. FIG. 25 shows a dedicated track pad constituted as an operation input device suitable for use in the viewing and reading of electronic newspaper according to the present invention. The dedicated track pad 2500 has switches and buttons each corresponding to scroll 2501, page change (next page) 2502, page change (previous page) 2503, zoom up 2504, zoom down 2505, clip 2506, clip cancel 2507, newspaper name (next) 2508, newspaper name (previous) 2509, date (next) 2510, and date (previous) 2511.

With respect to the above-mentioned scroll, page change, zoom, and clip operations, the interface between the operation module 5392 and the input/output module 5393 of FIG. 22 will be described in detail.

(1) Page-change interface (IF1)

A command for changing pages from current page to next page is performed when the setting of paper name, date, morning/evening, or page has been performed. For a magnification mode command for use in changing to a next page, a current magnification mode for using the magnification of the current page can be provided in addition to the low magnification mode in which the new page can be viewed in its entirety. A response to the page-change command is whether a new page exists or not.

(2) Scroll/zoom interface (IF2)

Commands for scrolling vertically or horizontally and zooming up or down an article inside the current page are given as follows.

If a following three-dimensional vector is defined:

$$-128 \leq x, y, z \leq 127$$

where x=horizontal scrolling parameter, y=vertical scrolling parameter, z=up/down zooming parameter, then, given scrolling speed be 5 meters/second in the case of 127 and zooming speed 10 times basic page/second in the case of 127, the product between each speed and operation time provides displacement and magnified amount. The responses to the scrolling and zooming commands are the display position and magnification ratio in the displayed page at the time when the command execution comes to an end.

(3) Stop interface (IF3)

This interface is constituted by a command for stopping a scrolling or zooming operation in execution and a response to this command. The response is a page displayed position and a magnification ratio at the time of stop.

(4) Clip interface (IF4)

A clipping command is given by a page number and an article number. The response to this command is whether a designated article exists or not.

The above-mentioned page displayed position and magnification ratio on the display screen are defined as follows. If the line density of a page transmitted by broadcasting is d lines/mm, one newspaper page is expressed in a dot matrix of 400d×540d because the size of one newspaper page is 40 cm×54 cm. All or part of this dot matrix is displayed on the screen in magnified or reduced state. For an newspaper article in display, the following definitions are made:

display position=coordinate (p, q) on the dot matrix at a point in the upper left corner of the screen;

magnification ratio=n/m, where m is the number of dots on the dot matrix and n is the number of dots on the screen.

Figure 26A:
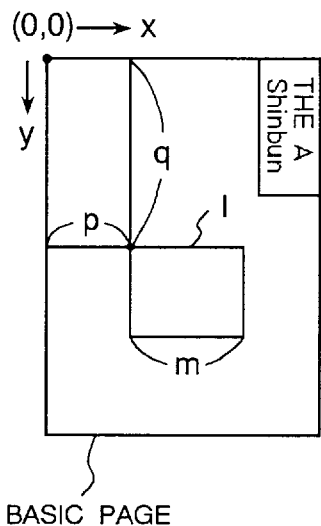
FIGS. 26(A) and (B) show display screens explaining an article display position and display magnification in a zoom operation.
Figure 26B:
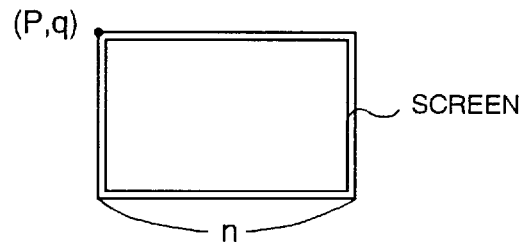
Figure 27:
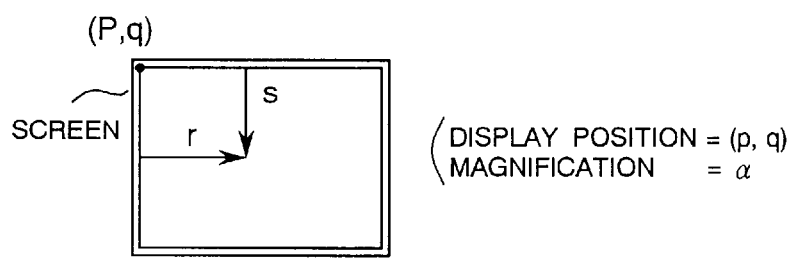
FIG. 27 shows a display screen indicating a cursor click point in a clipping operation.

Hereinafter, the dot matrix for one newspaper page is called "basic page". FIGS. 26(A) and 26(B) show the relationship between article I on the basic page and a magnified image on the screen.

Next, a method of determining an article number at the time of clipping will be described.

If a clipping operation is instructed with the cursor position on the screen being (r, s), the display position being (p, q), and the magnification ratio being α. Then, if the corresponding points on the basic page of the cursor position (r, s) are (u, v), the following is given:

$$u = p + r/\alpha$$

$$v = q + s/\alpha$$

On the other hand, as described before, the basic page (40 cm×54 cm) is divided into areas of 40×54 each being 1 cm$^2$ in size and assigned with a corresponding article number.

Consequently, the article numbers provide a 40×54 matrix (called KBM). Therefore, article number i on the cursor position (r, s) on the screen can be obtained from the following relation:

$$i = KBM(\lfloor(p+r/\alpha)/10d\rfloor, \lfloor(q+s/\alpha)/10d\rfloor)$$

where, |α| takes an integral number obtained by raising α. If i=0, it means a boundary area, and therefore the clipping operation must be redone.

The clipped article is automatically stored by the input/output software module into the disks at a predetermined storage area. When the storage area becomes full, it is notified by a message.

The clipped article stored in the disks is read out in the following procedure.

Figure 24:
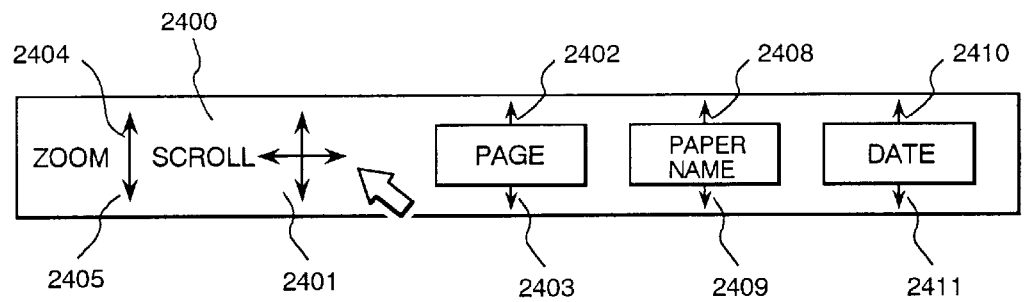
FIG. 24 shows a display screen explaining another example of the viewing processing by the cursor input device.
Figure 28:
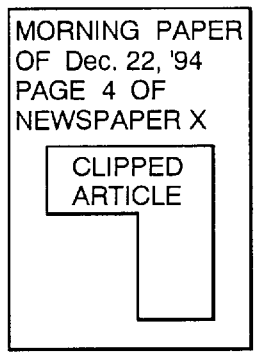
FIG. 28 is an example of a clipped article.

Referring to FIGS. 24 and 25, the "PAPER NAME" is updated to select the "CLIPPED ARTICLE." Then, one clipped article subsequent to the displayed date is displayed as shown in FIG. 28. Clipped articles are turned over by the above-mentioned page changing operation. A clipped article of a desired date can be retrieved by changing dates.

As apparent from the descriptions with reference to FIGS. 16 through 32, according to the present invention, an electronic newspaper can be viewed and read at the user terminal as easily as and in generally the same feeling as if it were a paper-based newspaper.

Thus, the newspaper on-demand system of FIG. 1 practiced as one preferred embodiment of the invention has been described in which desired newspaper page data are retrieved from the electronic newspaper page editing data system of a newspaper company, the retrieved data are formatted so that the same can be viewed at the user terminal, and the formatted data are viewed at the user terminal. In what follows, an advertisement system of FIG. 33, an application of the system of FIG. 1, will be described.

Figure 33:
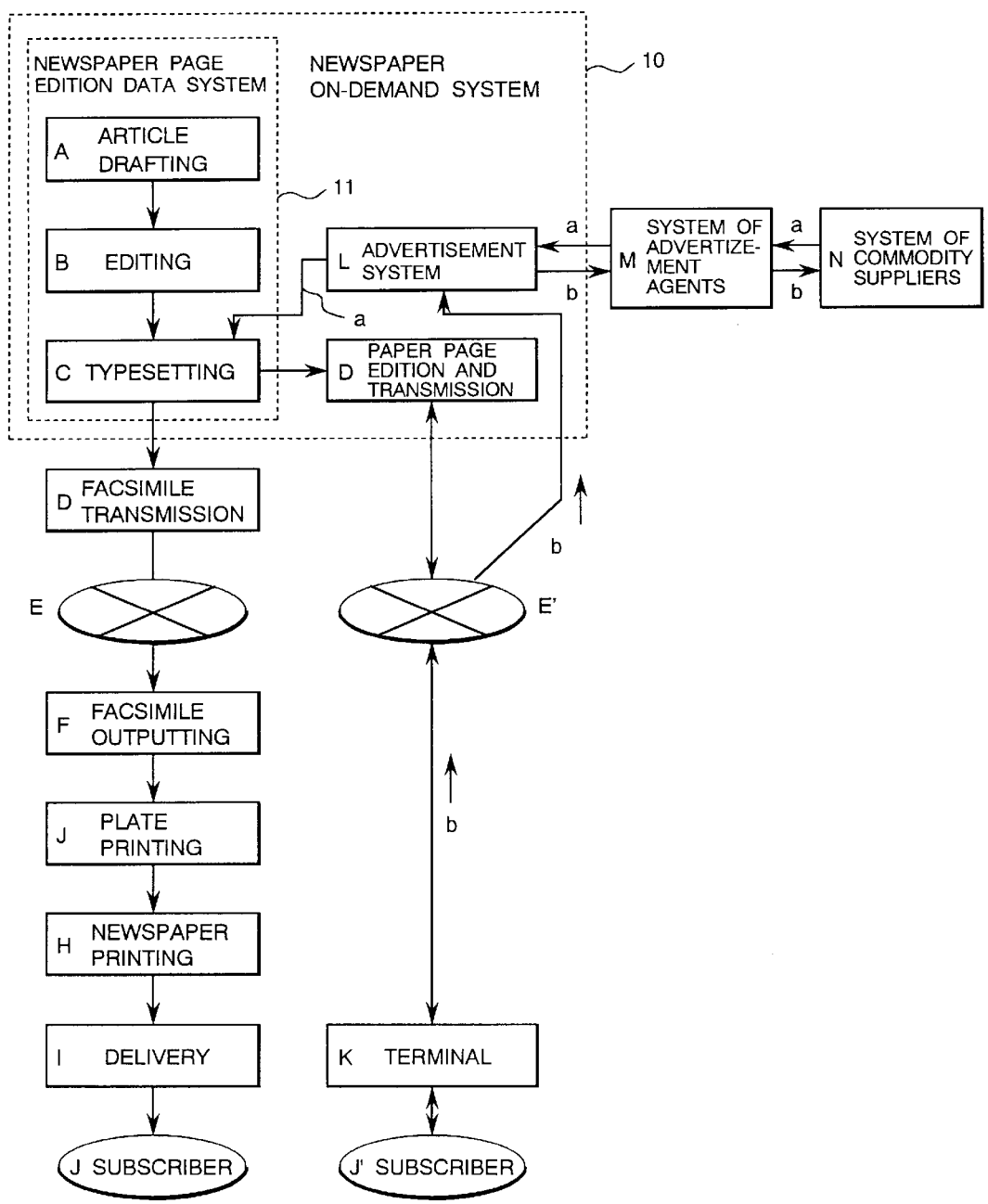
FIG. 33 is a block diagram illustrating an electronic newspaper advertisement ordering system practiced as an applicable embodiment of the invention.

Referring to FIG. 33, reference symbol L indicates an existing advertisement system of the newspaper company, reference symbol M indicates an advertisement system of an advertisement agent, and reference symbol N indicates a system of a commodity supplier. These three systems are attached to the system of FIG. 1. Referring to FIG. 33, currently, advertisement information of the system N of commodity supplier is captured in the advertisement system L of the newspaper company via the system M of advertisement agent along a route "a". At the newspaper company, the advertisement information puts the advertisement information into the typesetting system C to put the advertisement information on newspaper.

In addition, using these networked systems, the system of FIG. 33 designates a desired piece of advertisement directly from the advertisement displayed on the user (reader) terminal K and transmits the advertisement thus retrieved to the system M of advertisement agent or the system N of commodity supplier via the communication network E' and the system L of the newspaper company along a route "b". The system M or N sends back information necessary for ordering the designated commodity to the user terminal K via the communication network E', thereby accepting an order. It will be apparent that the system N of commodity supplier may be omitted from the above-mentioned novel setup. In what follows, the above-mentioned advertisement-based ordering system will be described in more detail.

When the user designates a desired piece of advertisement information by clicking the mouse for example at the receiver terminal K, an identification number of the receiver terminal K and an advertisement number of the designated advertisement are sent to the system M of the newspaper company via the communication network E'. It should be noted that the communication network E' needs to be capable of supporting both-way communication such as the telephone network or ISDN; therefore, a broadcasting network is not suitable for this application.

The system M of advertisement agent or the system N of commodity supplier sends back to the receiver terminal K the detailed information (orderer, price, delivery term and the like) required by the designated advertisement according to the received advertisement number, the commodity information being stored in a file.

At the receiver terminal, the user (reader) J enters information such as orderer, shipping address, quantity and the like to order the desired item based on the received detailed commodity information.

There are a variety of possible methods of payment. One is making the payment at the bank account of the commodity supplier from which the commodity is purchased.

As described and according to the present invention, there is provided a publication information transmission/viewing system for publications such as newspapers wherein articles of publications such as a newspaper for example are coded on an article basis at the publication information provider side such that image information of the articles and search information such as information indicating the position of a particular article on a particular page are included in the coded article information and the resultant coded article information is transmitted to the user terminal to be displayed on its display device for the user to viewing over a desired page and read a desired article in the page. The novel setup is advantageous in that the user can access and handle the electronic publication information in generally the similar feeling and convenience as those of paper-based publications while utilizing the electronic features such as searching, page changing, zooming, and clipping operations.

Further, the publication information provider can use the conventional paper-based publication editing system without change, the electronic transmitting/viewing system of publications such as newspapers can be added to the paper-based publication service with ease and at relatively low cost.

According to the invention, there is provided a publication information transmitting/viewing system that inherits the culture of the conventional paper-based publication service such as newspapers and its infrastructure without change, provides generally the similar convenience as that of paper-based publications, and coexists with publication information such as paper-based newspapers, thus providing a system significantly preferable for both the information provider and the user.

Moreover, the present invention is also applicable to electronic information systems such as VTR and CD-ROM and an electronic catalog system with significant advantages.

While the preferred embodiments of the present invention have been described using specific terms, such description is for illustrative purposes only, and it is to be understood that changes and variations may be made without departing from the spirit or scope of the appended claims.

What is claimed is:

1. A publication information transmitting system having an information provider apparatus, at least one user terminal, and transmitting means for transmitting information from at least said information provider apparatus to said at least one user terminal, said publication information transmitting system comprising:

generating means, based on a publication article constituted by two-dimensionally arranging a plurality of sub-articles composed of information having relatively higher information emphaticality and information having relatively higher information detailedness, for generating first information including image information for each of said plurality of sub-articles and positional information on said publication article in said information provider apparatus;

sending means for sending said first information from said information provider apparatus to said at least one user terminal via said transmitting means;

receiving means for receiving said first information into said at least one user terminal;

outputting means provided on said at least one user terminal, based on the received first information, for outputting said information having said relatively higher emphaticality as legible information; and another outputting means, based on said legible information, for outputting at least designated one of plurality of pieces of sub-article information from said at least one user terminal.

2. A publication information transmitting system according to claim 1, wherein said at least designated one of said plurality of pieces of sub-article information is outputted in a magnification ratio in which information having relatively higher information detailedness of said plurality of pieces of sub-article information is legible.

3. A publication information transmitting system according to claim 1, wherein output of said at least designated one of said plurality of sub-articles is the output of information obtained by clipping said at least designated one of said plurality of pieces of sub-article information, including the information of relatively higher information detailedness of said plurality of pieces of sub-article information.

4. A publication information transmitting system according to claim 1, wherein said information having higher information emphaticality is an article headline corresponding to the designated one of said plurality of sub-articles and said information having higher information detailedness is an article text corresponding to said designated one of said plurality of sub-articles.

5. A publication information transmitting system according to claim 1 further comprising:

scrolling means for scrolling to display said information having relatively higher information emphaticality.

6. A publication information transmitting system according to claim 1, wherein said generating means for generating said first information comprising:

coding means for constituting a virtual page in which each sub-article area is regarded as a blank area having no article information except for a particular article area of said publication article, each of resultant virtual pages being coded; and generating means for generating an aggregate of the coded virtual pages as sub-article positional information.

7. A publication information transmitting system according to claim 1, wherein said at least one user terminal comprising:

if said first information is based on the publication article that is composed of a plurality of pages, outputting means for outputting at least said sub-article information while changing said plurality of pages.

8. A publication information transmitting system according to claim 1, wherein said sending means for sending said first information is broadcasting.

9. A publication information transmitting system according to claim 1 further comprising:

if said sending means for sending said first information is broadcasting, broadcasting means for broadcasting said first information on a publication basis a plurality of times continuously.

10. A publication information transmitting system according to claim 1, wherein the sending of said first information is performed on demand from said at least one user terminal.

11. A publication information transmitting system according to claim 1, wherein said sending means for sending said first information comprising:

broadcasting means for broadcasting said information having relatively higher information emphaticality; and transmitting means for transmitting said information having relatively higher information detailedness via a communication network.

12. A publication information transmitting system according to claim 1, wherein said information having relatively higher information detailedness is audio/video information.

13. A publication information transmitting system according to claim 1, wherein said first information is based on a plurality of publication articles and said sending means for sending said first information sends said first information based on at least one of said plurality of publication articles to said at least one user terminal.

14. A publication information transmitting system according to claim 1, wherein said first information further has control information based on at least one of an electronic code and an electronic format of said sub-article information, said image information being encrypted.

15. A publication information transmitting system according to claim 14, wherein said first information further has a version number attached to a head of article information including at least one piece of said sub-article information to control a format of said article information.

16. A publication information transmitting system according to claim 1, wherein said first information has a sub-article of advertisement information as article information including at least one piece of said sub-article information, said at least one user terminal further comprising sending means for sending ordering information designating said advertisement information to said information provider apparatus and at least one of other user terminals, and said information provider apparatus further comprising processing means for performing ordering processing based on said ordering information.

17. A publication information transmitting system according to claim 1, wherein said at least one user terminal further comprising:

at least one command processing means for performing at least one of operations including page-changing, scrolling, zooming, and clipping said sub-article information to be outputted.

18. A publication information transmitting system according to claim 1, wherein said at least one user terminal further comprising:

at least one of a cursor-type pointing device and a dedicated track pad for performing at least one of operations including page-changing, scrolling, zooming, and clipping said sub-article information to be outputted.

19. A publication information transmitting system according to claim 1 further comprising:

if said sending means for sending said first information is broadcasting, broadcasting means for broadcasting said first information at least once continuously for each of the plurality of publications.

20. A publication information transmitting system according to claim 1 further comprising:
 if said sending means for sending said first information is broadcasting, broadcasting means for broadcasting said first information at least once continuously for each of the plurality of publication articles.

21. A publication information transmitting system having an information provider apparatus, at least one user terminal, and transmitting means for transmitting information from at least said information provider apparatus to said at least one user terminal, said publication information transmitting system comprising:
 generating means, based on a publication article constituted by two-dimensionally arranging a plurality of sub-articles having at least one of information emphaticality and information detailedness which varies gradually with each of said plurality of sub-articles, for generating first information including image information for each of said plurality of sub-articles and positional information on said publication article in said information provider apparatus;
 sending means for sending said first information from said information provider apparatus to said at least one user terminal via said transmitting means;
 receiving means for receiving said first information into said at least one user terminal;
 display means provided on said at least one user terminal, based on the received first information, for outputting the information having higher emphaticality than that of the other information from said at least one user terminal as legible information; and
 outputting means, based on said legible information, for outputting at least designated one of plurality of pieces of sub-article information from said at least one user terminal.

22. A publication information transmitting system according to claim 21, wherein said at least designated one of said plurality of pieces of sub-article information is outputted in a magnification ratio in which the sub-article information having higher information detailedness than that of other sub-article information is legible.

23. A publication information transmitting system according to claim 21, wherein output of said at least designated one of said plurality of pieces of sub-article information is the output of information obtained by clipping said at least designated one of said plurality of pieces of sub-article information, including the sub-article information having higher information detailedness than that of other sub-article information.

24. A publication information transmitting system according to claim 21 further comprising:
 scrolling means for scrolling to display said information having higher emphaticality than that of the other information.

25. A publication information transmitting system according to claim 21, wherein said generating means for generating said first information comprising:
 coding means for constituting a virtual page in which each sub-article area is regarded as a blank area having no article information except for a particular article area of said publication article, each of resultant virtual pages being coded; and
 generating means for generating an aggregate of the coded virtual pages as sub-article positional information.

26. A publication information viewing system based on a publication system having means for obtaining electronic page information by electronically editing a lot of pieces of article information, said publication viewing system comprising:
 an information provider apparatus;
 at least one user terminal;
 transmitting means for transmitting information from at least said information provider apparatus to said at least one user terminal;
 generating means, based on a publication article constituted by two-dimensionally arranging a plurality of sub-articles composed of information having relatively higher information emphaticality and information having relatively higher information detailedness, for generating terminal information including a group of information having relatively higher information emphaticality and a group of information having relatively higher information detailedness for each of said plurality of sub articles in said information provider apparatus;
 sending means for sending said terminal information from said information provider apparatus to said at least one user terminal via said transmitting means;
 receiving means for receiving said terminal information into said at least one user terminal;
 outputting means provided on said at least one user terminal, based on the received terminal information, for outputting said information having said relatively higher emphaticality as legible information; and
 another outputting means, based on said legible information, for outputting at least designated one of plurality of pieces of sub-article information from said at least one user terminal.

27. A publication information viewing system according to claim 26, wherein said terminal information is based on a plurality of publication articles and said sending means for sending said terminal information sends said terminal information based on at least one of said plurality of publication articles to said at least one user terminal.

28. A publication information viewing system according to claim 26, wherein said terminal information has a sub-article of advertisement information as article information including at least one piece of said sub-article information,
 said at least one user terminal further comprising sending means for sending ordering information designating said advertisement information to said information provider apparatus and at least one of other user terminals,
 and said information provider apparatus further comprising processing means for performing ordering processing based on said ordering information.

29. A publication information viewing system according to claim 26, wherein said at least one user terminal further comprising:
 at least one command processing means for performing at least one of operations including page-changing, scrolling, zooming, and clipping said sub-article information to be outputted.

30. A publication information viewing system according to claim 26, wherein said at least one of user terminal further comprising:
 at least one of a cursor-type pointing device and a dedicated track pad for performing at least one of operations including page-changing, scrolling, zooming, and clipping said sub-article information to be outputted.

31. A publication information viewing system comprising:
- a publication composed of an electronic medium that stores electronic page information obtained by electronically editing a lot of pieces of article information;
- an information provider apparatus;
- at least one user terminal;
- transmitting means for transmitting information from at least said information provider apparatus to said at least one user terminal;
- generating means, based on a publication article constituted by two-dimensionally arranging a plurality of sub-articles composed of information having relatively higher information emphaticality and information having relatively higher information detailedness, for generating in said information provider apparatus terminal information including a group of information having relatively higher information emphaticality and a group of information having relatively higher information detailedness for each of said plurality of sub articles;
- sending means for sending said terminal information from said information provider apparatus to said at least one user terminal via said transmitting means;
- receiving means for receiving said terminal information into said at least one user terminal;
- outputting means provided on said at least one user terminal, based on the received terminal information, for outputting said information having said relatively higher emphaticality as legible information; and
- another outputting means, based on said legible information, for outputting at least designated one of plurality of pieces of sub-article information from said at least one user terminal.

32. A publication information viewing system according to claim 31, wherein said terminal information further has control information based on at least one of an electronic code and an electronic format of said sub-article information, said image information being encrypted.

33. A publication information transmitting system according to claim 32, wherein said terminal information further has a version number attached to a head of article information including at least one piece of said sub-article information to control a format of said article information.

34. A publication information transmitting system having an information provider apparatus, at least one user terminal, and transmitting means for transmitting information from at least said information provider apparatus to said at least one user terminal, said publication information transmitting system comprising:
- generating means, based on a publication article constituted by two-dimensionally arranging a plurality of sub-articles composed of information having relatively higher emphaticality and information having relatively higher detailedness, for generating first information including image information for each of said plurality of sub-articles, an article number, and information about a boundary line between sub-article minor areas in said information provider apparatus;
- sending means for sending said first information from said information provider apparatus to said user terminal via said transmitting means;
- receiving means for receiving said first information into said at least one user terminal;
- designating means, based on the received first information and by specifying one point on a desired article minor areas, for designating an area number in said desired article minor area; and
- outputting means for outputting the sub-article information about the designated article minor area from said user terminal.

35. A publication information transmitting method for a system having an information provider apparatus, at least one user terminal, and transmitting means for transmitting information from at least said information provider apparatus to said at least one user terminal, said publication information transmitting method comprising the steps of:
- generating, based on a publication article constituted by two-dimensionally arranging a plurality of sub-articles composed of information having relatively higher information emphaticality and information having relatively higher information detailedness, for generating first information including image information for each of said plurality of sub-articles and positional information on said publication article in said information provider apparatus;
- sending said first information from said information provider apparatus to said at least one user terminal via said transmitting means;
- receiving said first information into said at least one user terminal;
- outputting, on said at least one user terminal, based on the received first information, said information having said relatively higher emphaticality as legible information; and
- outputting, based on said legible information, at least designated one of plurality of pieces of sub-article information from said at least one user terminal.

36. A publication information transmitting method for a system having an information provider apparatus, at least one user terminal, and transmitting means for transmitting information from at least said information provider apparatus to said at least one user terminal, said publication information transmitting method comprising the steps of:
- generating, based on a publication article constituted by two-dimensionally arranging a plurality of sub-articles having at least one of information emphaticality and information detailedness which varies gradually with each of said plurality of sub-articles, first information including image information for each of said plurality of sub-articles and positional information on said publication article in said information provider apparatus;
- sending said first information from said information provider apparatus to said at least one user terminal via said transmitting means;
- receiving said first information into said at least one user terminal;
- displaying, on said at least one user terminal, based on the received first information, the information having higher emphaticality than that of other information from said at least one user terminal as legible information; and
- outputting, based on said legible information, at least designated one of plurality of pieces of sub-article information from said at least one user terminal.

37. A publication information viewing method for a system having means for obtaining electronic page information by electronically editing a lot of pieces of article information, an information provider apparatus, at least one user terminal, and transmitting means for transmitting information from at least said information provider apparatus to said at least one user terminal, said publication information viewing method comprising the steps of:

generating, based on a publication article constituted by two-dimensionally arranging a plurality of sub-articles composed of information having relatively higher information emphaticality and information having relatively higher information detailedness, terminal information including a group of information having relatively higher information emphaticality and a group of information having relatively higher information detailedness for each of said plurality of sub articles in said information provider apparatus;

sending said terminal information from said information provider apparatus to said at least one user terminal via said transmitting means;

receiving said terminal information into said at least one user terminal;

outputting, on said at least one user terminal, based on the received terminal information, said information having said relatively higher emphaticality as legible information; and outputting, based on said legible information, at least designated one of plurality of pieces of sub-article information from said at least one user terminal.

38. A publication information viewing method for a system having a publication composed of an electronic medium that stores electronic page information obtained by electronically editing a lot of pieces of article information, an information provider apparatus, at least one user terminal, and transmitting means for transmitting information from at least said information provider apparatus to said at least one user terminal, said publication information viewing method comprising the steps of:

generating, based on a publication article constituted by two-dimensionally arranging a plurality of sub-articles composed of information having relatively higher information emphaticality and information having relatively higher information detailedness, terminal information including a group of information having relatively higher information emphaticality and a group of information having relatively higher information detailedness for each of said plurality of sub articles in said information provider apparatus;

sending said terminal information from said information provider apparatus to said at least one user terminal via said transmitting means;

receiving said terminal information into said at least one user terminal;

outputting, on said at least one user terminal, based on the received terminal information, said information having said relatively higher emphaticality as legible information; and outputting, based on said legible information, at least designated one of plurality of pieces of sub-article information from said at least one user terminal.

39. A publication information transmitting method for a system having an information provider apparatus, at least one user terminal, and transmitting means for transmitting information from at least said information provider apparatus to said at least one user terminal, said publication information transmitting method comprising the steps of:

generating, based on a publication article constituted by two-dimensionally arranging a plurality of sub-articles composed of information having relatively higher emphaticality and information having relatively higher detailedness, first information including image information for each of said plurality of sub-articles, an article number, and information about a boundary line between sub-article minor areas in said information provider apparatus;

sending said first information from said information provider apparatus to said user terminal via said transmitting means;

receiving said first information into said at least one user terminal;

designating, based on the received first information and by specifying one point on a desired article minor areas, an area number in said desired article minor area; and outputting the sub-article information about the designated article minor area from said user terminal.

\* \* \* \* \*